United States Patent
Diwane et al.

(10) Patent No.: US 10,750,368 B1
(45) Date of Patent: Aug. 18, 2020

(54) SECURITY PROTECTION TO PREVENT UNAUTHORIZED USE OF MOBILE NETWORK EXTENDERS

(71) Applicant: Cisco Technology, Inc., San Jose, CA (US)

(72) Inventors: Shivaji Pundlik Diwane, Pleasanton, CA (US); Hungjen Sean Yang, San Jose, CA (US); Sundara Paal Rani Thirumalaiappan, Sunnyvale, CA (US); Keith Neil Mark Dsouza, Pacifica, CA (US); Sendilvadivu Ganesan, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/291,833

(22) Filed: Mar. 4, 2019

(51) Int. Cl.
*H04W 12/08* (2009.01)
*H04W 12/00* (2009.01)
(Continued)

(52) U.S. Cl.
CPC ......... *H04W 12/08* (2013.01); *H04W 12/003* (2019.01); *H04W 12/04031* (2019.01); *H04W 12/0609* (2019.01); *H04W 12/1206* (2019.01)

(58) Field of Classification Search
CPC ............ H04W 12/08; H04W 12/0609; H04W 12/04031; H04W 12/1206; H04W 12/003;
(Continued)

(56) References Cited

U.S. PATENT DOCUMENTS

| 7,188,180 B2 * | 3/2007 | Larson | H04L 29/12301 |
| | | | 709/227 |
| 7,822,209 B2 * | 10/2010 | Fu | H04L 9/0897 |
| | | | 380/281 |

(Continued)

FOREIGN PATENT DOCUMENTS

EP       2506454 B1     3/2012

OTHER PUBLICATIONS

Cradlepoint, Inc., "Cradlepoint Arc CBA850 Product Manual Cellular Broadband Adapter", User Manual Firmware version 5.4.0, https://cradlepoint.com/sites/default/files/upload-file/arc_cba850_manual_1.3.pdf, Apr. 28, 2015, 161 pages.

(Continued)

*Primary Examiner* — Thanhnga B Truong
(74) *Attorney, Agent, or Firm* — Edell, Shapiro & Finnan, LLC

(57) ABSTRACT

In one illustrative example, a mobile network extender has a network interface configured to connect with a host router and a cellular modem configured to provide a wireless link for communications via a cellular mobile network. In a pairing process, the extender may establish a secure encrypted channel with the router via the network interface. In a locking process, the extender may receive information from the router and verify the information. Upon verification, the extender may be set in a locked state in which the extender is logically locked to the router. The extender may also receive and store a secret session key from the router, and permit the router to acquire the extender for communications. In the locked state, the extender may permit or deny subsequent router acquisition upon router reconnection based on verifying, using the secret session key, authentication data received via the network interface.

20 Claims, 18 Drawing Sheets

(51) Int. Cl.
*H04W 12/12* (2009.01)
*H04W 12/06* (2009.01)
*H04W 12/04* (2009.01)

(58) Field of Classification Search
CPC ......... H04L 12/56; H04L 9/32; G06F 15/173; G06F 12/00; G06F 15/167
See application file for complete search history.

(56) References Cited

U.S. PATENT DOCUMENTS

| | | | | |
|---|---|---|---|---|
| 8,521,126 | B2* | 8/2013 | Bumiller | H04M 1/72541 |
| | | | | 455/404.1 |
| 8,923,813 | B2 | 12/2014 | Bosch et al. | |
| 9,542,237 | B2* | 1/2017 | Baron | G06F 9/526 |
| 9,820,314 | B2 | 11/2017 | Sidhu et al. | |
| 9,832,173 | B2 | 11/2017 | Britt et al. | |
| 9,913,127 | B1 | 3/2018 | Polepalli | |
| 10,044,674 | B2 | 8/2018 | Liu et al. | |
| 2007/0030857 | A1* | 2/2007 | Fulknier | H04L 45/00 |
| | | | | 370/401 |
| 2012/0096106 | A1* | 4/2012 | Blumofe | G06Q 50/00 |
| | | | | 709/213 |
| 2015/0139033 | A1 | 5/2015 | Magnuson et al. | |
| 2017/0366575 | A1 | 12/2017 | Polepalli et al. | |

OTHER PUBLICATIONS

Fortinet, Inc., "FortiExtender™ FortiExtender 20D, 40D and 100B", FEXT-DAT-R13-201708, https://www.fortinet.com/content/dam/fortinet/assets/data-sheets/FortiExtender.pdf, downloaded Mar. 4, 2019, 5 pages.
Cisco, "Cisco Fourth-Generation LTE Wireless WAN Enhanced High-Speed WAN Interface Cards", C78-710314-07, Mar. 2014, 12 pages.
Fortinet Technologies, Inc., "FortiExtender 4.0.0 Admin Guide", Feb. 27, 2019, 61 pages.
Digi International Inc., "Digi® 6300-CX", https://www.digi.com/productsinetworking/cellular-routers/enterprise/digi-6300-cx, downloaded Apr. 1, 2020, 5 pages.
Samsung Electronics Co. Ltd., "Verizon 4G LTE Network Extender User Guide", Network Systems Samsung Electronics America, Document Version 1.3, Jun. 2016, 38 pages.
Samsung Electronics Co. Ltd., "Verizon 4G LTE Network Extender 2 for Enterprise User Guide 3.4", Network Systems Samsung Electronics America, Document Version 1.0, Mar. 2019, 123 pages.
Samsung Telecommunications America, LLC, "Verizon Wireless Network Extender", Verizon NE_PM_020910_F19, downloaded Apr. 1, 2020, 67 pages.
Nokia, "WiFi user guide", Document code: SR1811030551EN (Nov.) CID205840, downloaded Apr. 1, 2020, 40 pages.
ZTE, "H560N Quick Start Guide", Wireless Router, downloaded Apr. 1, 2020, 17 pages.

* cited by examiner

SECURITY PROTECTION TO PREVENT UNAUTHORIZED USE OF MOBILE NETWORK EXTENDERS

TECHNICAL FIELD

The present disclosure relates generally to mobile network extenders for use with host routers, and more particularly relates to security protection to prevent unauthorized use of such mobile network extenders.

BACKGROUND

Mobile network extenders, such as 4G/5G extenders, also known as Extended Input/Output (EIO) modules, may be used with host routers to provide wide area network (WAN) access to (e.g. enterprise) private networks. An enterprise private network may use an extender for primary or backup WAN access.

An extender typically includes a network interface for connection to the host router and a cellular modem to provide a wireless link to a mobile network. For good cellular signal reception, the extenders are typically mounted in a relatively high location of a building, such as a rooftop, of the enterprise.

Unfortunately, such exposure makes the extender a likely target for theft. In some situations, a stolen extender may provide unauthorized access to the private network, which may then be made vulnerable to a malware attack or the like.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1A:
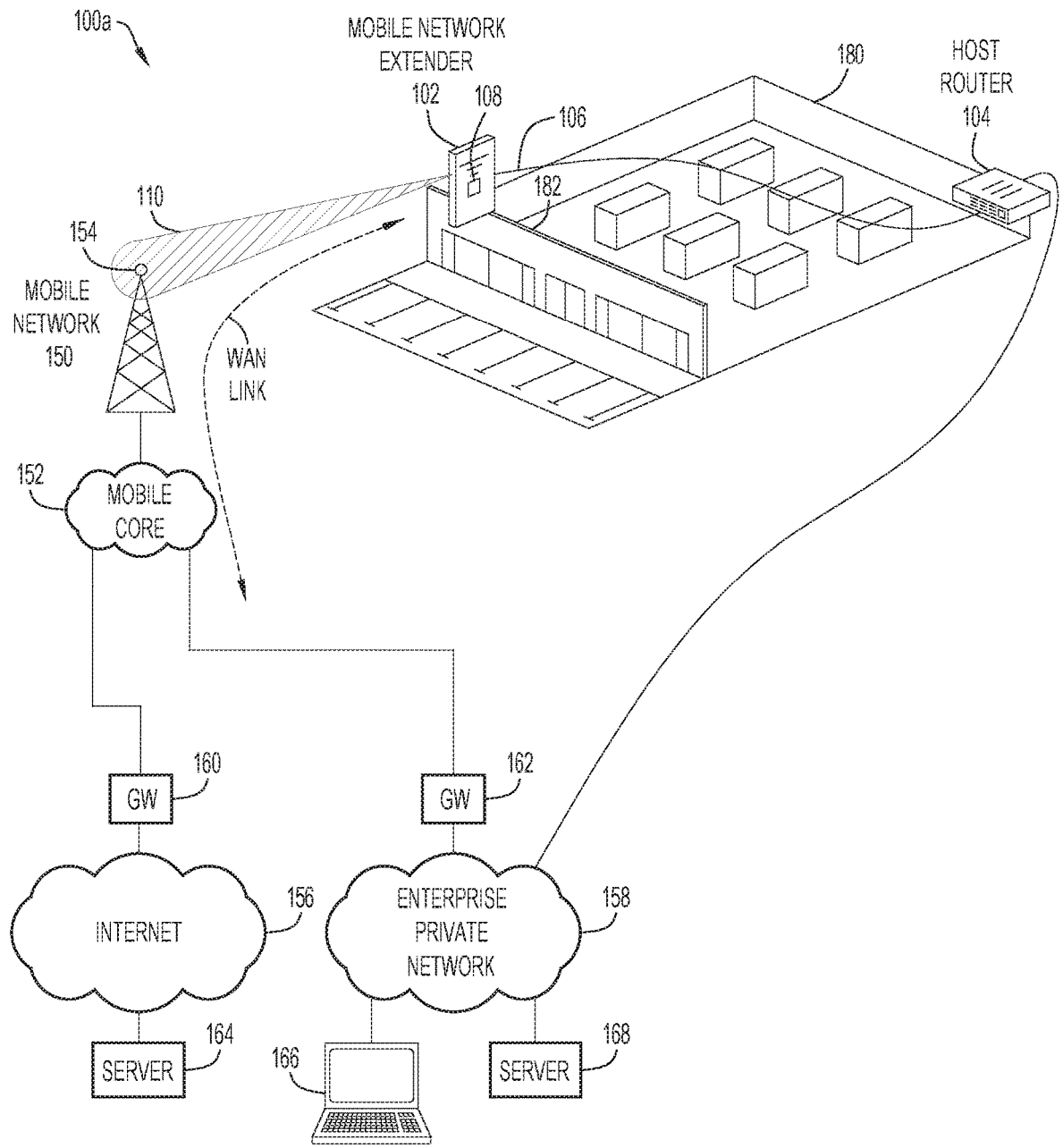
FIG. 1A is an illustrative representation of a communication system which includes a mobile network extender for use with a host router.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for security protection to prevent unauthorized use of mobile network extenders are described herein.

According to the present disclosure, a mobile network extender may have a network interface configured to connect with a host router and a cellular modem configured to provide a wireless link for communications via a cellular mobile network. The cellular modem may include one or more subscriber identity module (SIM) interfaces, each of which is configured to receive a SIM.

In one illustrative example, the extender may be used in a "standalone configuration" with the host router. As a result of a pairing process, the extender may establish a secure encrypted channel with the host router via the network interface. As part of a locking process, the extender may receive information from the host router over the secure encrypted channel and verify the information. This information may be extender information and/or SIM information. In response to a positive verification, the extender may be set in a locked state in which the extender is logically locked to the host router. The extender may also lock a SIM connected at the SIM interface. The extender may also receive and store a secret session key from the host router, and permit the host router to acquire the extender for communications via the wireless link.

In the locked state, the extender may permit or deny subsequent router acquisition upon router reconnection based on verifying, using the secret session key, authentication data received via the network interface. In some implementations, the extender may permit subsequent router acquisition upon router reconnection based on verifying that the authentication data matches the stored secret session key, and deny subsequent router acquisition upon router reconnection if the authentication data fails to match the stored secret session key.

Further, the extender may be set, by the host router, from the locked state to an unlocked state in which the extender is logically unlocked from the host router. Here, the secret session key may be erased or deleted from memory. In the unlocked state, the extender may permit subsequent router acquisition upon router reconnection without verification of authentication data using the old, secret session key. Rather, in the unlocked state, the extender may permit subsequent router acquisition upon reconnection based again on the verification of the extender information (e.g. the extender information and/or the SIM information).

In another illustrative example, the extender may be used in a "cloud-based configuration" with a host router. The extender may perform a verification procedure which includes verifying a security pass P received from a host router via the network interface with a "cross-reference" security pass P1 calculated at the extender. At the host router, the security pass P may be calculated as a function of a device certificate of the host router, an extender security token associated with the extender, and a random number. At the extender, the security pass P1 may also be calculated a function of the device certificate of the host router, the extender security token associated with the extender, and the random number. Prior to the verification procedure, a cloud server may generate the extender security token based on information associated with the extender and send it to the extender and the host router for calculation of the security passes.

In response to a positive security pass verification, the extender may be set in a locked state in which the extender is logically locked to the host router. The extender may also lock a SIM connected at the SIM interface. The extender may then permit the host router to acquire the extender for communications via the wireless link. In the locked state, the extender may permit or deny subsequent router acquisition of the extender upon reconnection based on a result of again performing the verification procedure.

More detailed and alternative techniques and implementations are provided herein as described below.

Example Embodiments

FIG. 1A is an illustrative representation of a communication system 100a. In communication system 100a, a mobile network extender 102 ("extender" 102) may be provided for use with a host router 104. Extender 102 may have a network interface configured to connect with host router 104 and a cellular modem configured to provide communications via a wireless link 110 for communications via a mobile network 150. Extender 102 may be alternatively referred to as an Extended Input/Output (EIO) module.

As shown in FIG. 1A, extender 102 may be connected to and paired with host router 104 via a wired connection 106, which may be an ethernet or fiber optic connection. Extender 102 may be positioned in a suitable location in a building 180, such as a rooftop 182 or other relatively high location in or on the building 180. The cellular modem of the extender 102 may include an antenna 208 (shown in FIG. 2) for the wireless communications 110 with a base station 154 (e.g. eNB or gNB) of the mobile network 150. The cellular modem of the extender 102 may also include one or more subscriber identity module (SIM) interfaces each of which is used for connection with a SIM.

Host router 104 may be connected as part of a private (enterprise) network 158 associated with an enterprise. Host router 104 may be configured to acquire the extender 102 for communications via the wireless link 110 to provide wide area network (WAN) access for the private network 158. The private network 158 may utilize the extender 102 for primary WAN access or secondary (e.g. backup) WAN access.

Mobile network 150 may include a mobile network core 152 and the one or more base stations 154. Gateways of the mobile network 150 may provide access to other communication networks. For example, a gateway 160 of mobile network 150 may provide access to a WAN, such as the Internet 156 having one or more servers 164 and the like. A gateway 162 of mobile network 150 may provide access to enterprise private network 158 having one or more endpoints 166 (e.g. computers, tablets, smartphones, etc.) and one or more servers 168 and the like.

As described above, extender 102 may be mounted at a location in or on a building 180, such as the rooftop 182 (e.g. the building's exterior). Unfortunately, such exposure makes the extender 102 a likely target for theft.

Figure 1B:
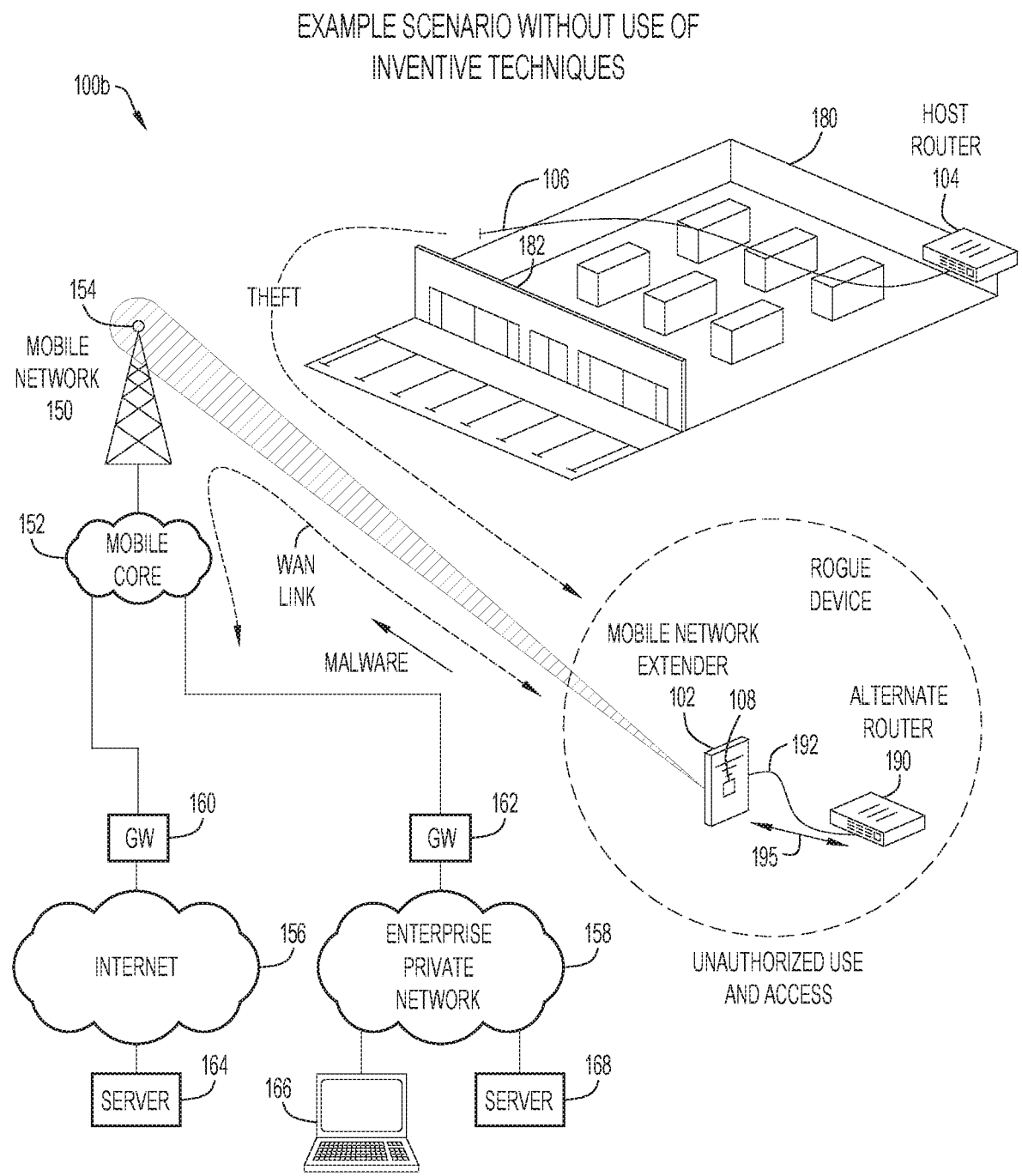
FIG. 1B is an illustrative representation of the communication system of FIG. 1A, but where the extender has been stolen and used in an unauthorized manner.

A scenario where the extender 102 has been stolen and used in an unauthorized manner is depicted in a communication system 100b of FIG. 1B. Here, extender 102 may be connected to, paired with, and acquired by (see e.g. an acquisition link 195) an alternate host router 190 (e.g. of similar make and construction as authorized host router 104). The alternate host router 190 may acquire the extender 102 for communications via a wireless link to mobile network 150 to provide, in some situations, unauthorized access to the private network 158 (e.g. via an enterprise APN gateway). Here, it may be possible that private network 158 is subject to a malware attack or the like.

Figure 1C:
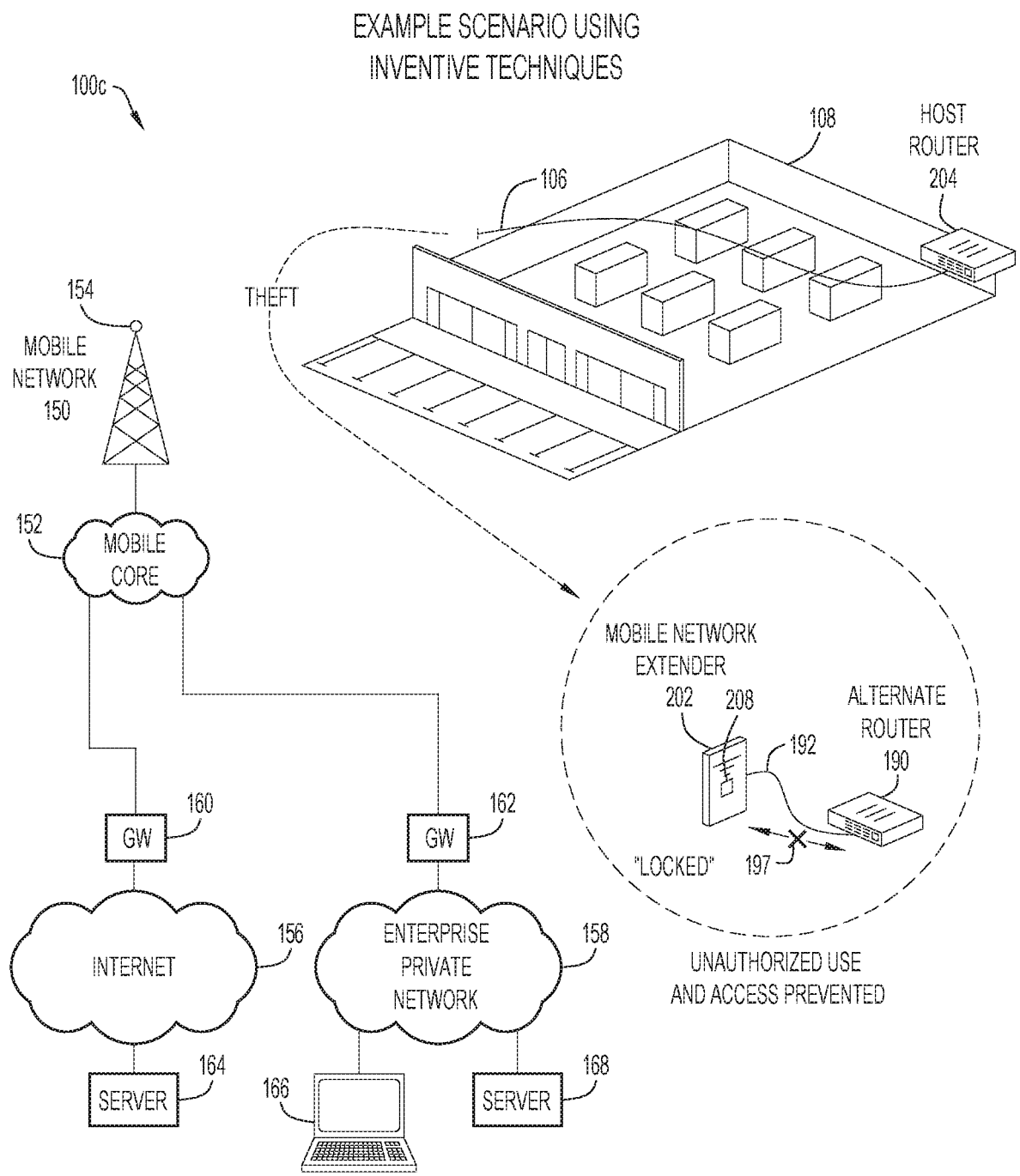
FIG. 1C is an illustrative representation of the communication system of FIG. 1A, where an extender of the present disclosure has been stolen but prevented from unauthorized use according to security protection techniques of the present disclosure.

According to the present disclosure, security protection to prevent unauthorized use of extenders may be provided, in order to eliminate or at least greatly reduce the likelihood of such problems. A scenario is depicted in a communication system 100c of FIG. 1C, where an extender 202 of the present disclosure has been disconnected from a host router 204 and used in an unauthorized manner. According to the present disclosure, extender 202 has been set in a locked state in which the extender is logically locked for (exclusive) use with host router 204, until it has been unlocked by the same host router 204 or other authorized means. Thus, extender 202 may be connected to alternate host router 190 but be prevented from being acquired by the alternate host router 190 (see e.g. an acquisition link establishment prevention 197). Thus, unauthorized access to the private network 158 is prevented as access to the wireless link is prevented.

Figure 2:
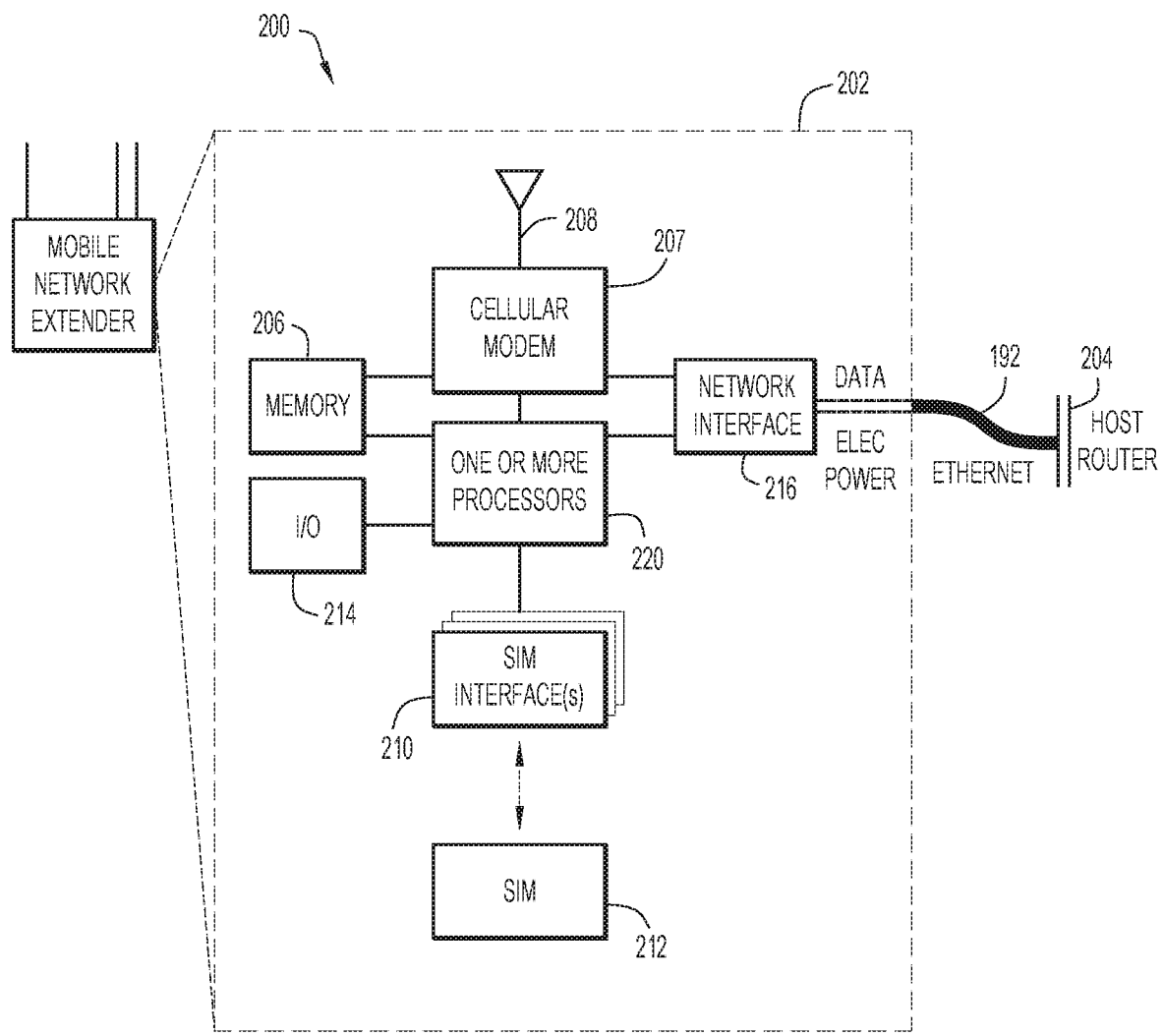
FIG. 2 is a schematic block diagram of a mobile network extender according to some implementations of the present disclosure.

FIG. 2 is a schematic block diagram 200 of the mobile network extender 202 according to some implementations of the present disclosure. The extender 202 of FIG. 2 may include one or more processors 220, a memory 206, and an input/output (I/O) device 214. The I/O device 214 may be or include one or more user input switches and/or a visual display. Extender 202 may also include a network interface 216 and a cellular modem 207 with an antenna 208. Network interface 216 may be configured to connect with a host router 204 via a wired connection (e.g. Ethernet or Fiber Optic). Cellular modem 207 may be configured to provide a wireless link for communications via a cellular mobile network. In addition, one or more SIM interfaces 210 may be provided, each one of which is configured to receive a SIM 212. One of the SIM interfaces 210 may be an active SIM interface which is active and in-use with cellular modem 207.

Figure 3A:
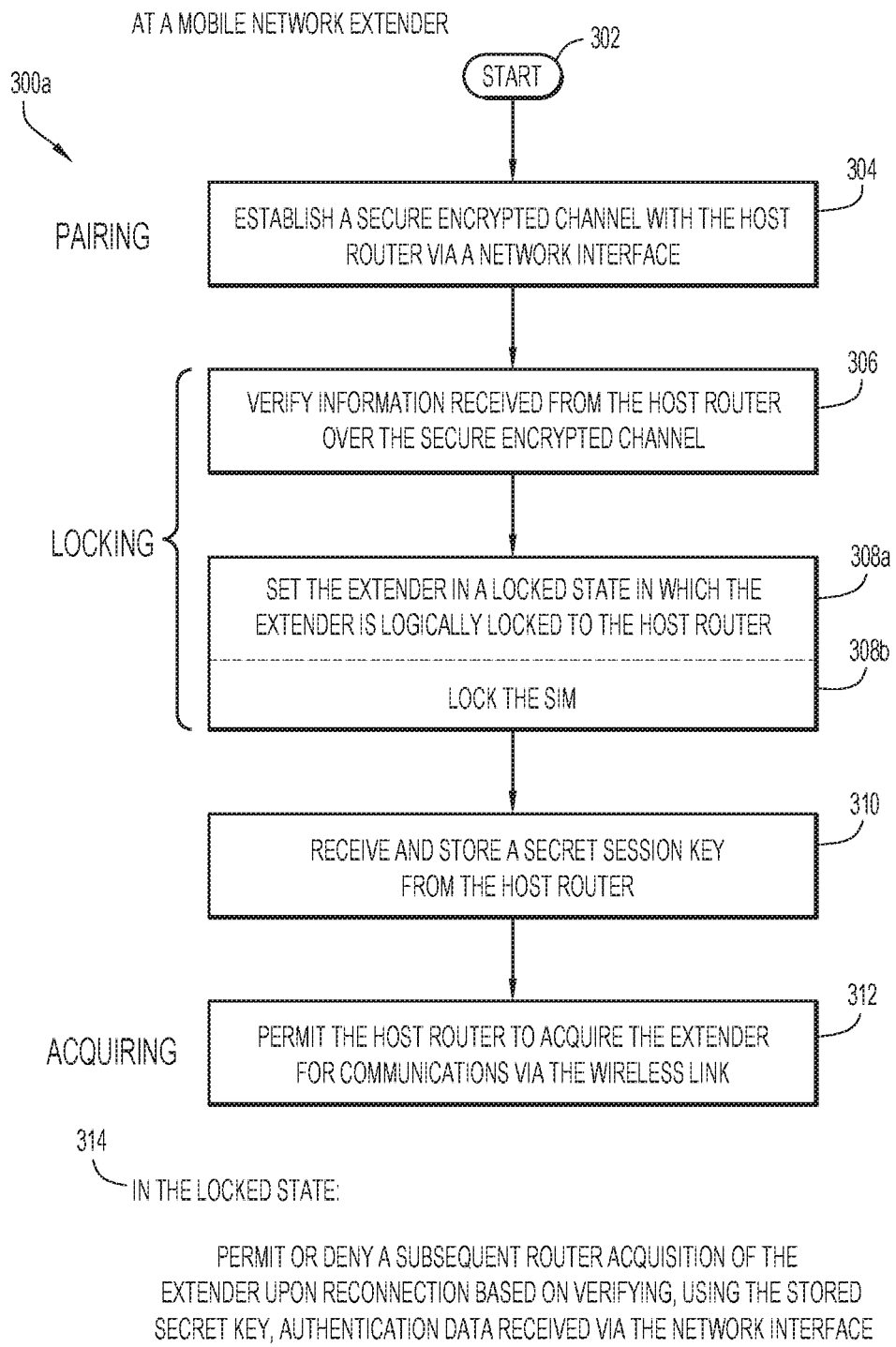
FIG. 3A is a flowchart for describing a method for use in providing security protection to prevent unauthorized use of a mobile network extender, in a standalone configuration, according to some implementations of the present disclosure.

FIG. 3A is a flowchart 300a for describing a method of providing security protection to prevent unauthorized use of a mobile network extender according to some implementations of the present disclosure. The extender may include a network interface configured to connect with a host router and a cellular modem configured to provide a wireless link for communications via a cellular mobile network. The cellular modem may include one or more SIM interfaces each configured to receive a SIM. The extender may include one or more processors and memory coupled to the one or more processors. The method may be embodied as a computer program product including a non-transitory computer readable medium and instructions stored in the computer readable medium, where the instructions are executable on one or more processors of the extender for performing the steps of the method.

In this illustrative example, the extender may be used in a "standalone configuration" with the host router. Beginning at a start block 302 of FIG. 3A, the extender may participate in a pairing process with a host router. As a result of the pairing process, the extender may establish a secure encrypted channel with the host router via the network interface (step 304 of FIG. 3A). The extender may then participate in a locking process with the host router, which may be initiated by a locking request from the host router. Here, the extender may receive information from the host router over the secure encrypted channel and verify the information (step 306 of FIG. 3A). The information may be extender information and/or SIM information. In response to verifying the information, the extender may be set in a locked state in which the extender is logically locked to the host router (step 308a of FIG. 3A). The extender may also lock the SIM via the SIM interface (step 308b of FIG. 3A). The extender may receive a secret session key from the host router and store it in memory (step 310 of FIG. 3A), and permit the host router to acquire the extender for communications via the wireless link (step 312 of FIG. 3A).

In the locked state, after router disconnection, the extender may permit or deny subsequent router acquisition upon reconnection based on verifying, using the stored secret session key, authentication data received via the network interface (an indication 314 of FIG. 3A). In some implementations, the extender may permit subsequent router acquisition upon router reconnection based on verifying that the authentication data matches the stored secret session key, and deny subsequent router acquisition upon router reconnection if the authentication data fails to match the stored secret session key.

In some implementations, the extender may receive, from the host router, one or more messages indicating a request for unlocking the extender. In response, the extender may be set from the locked state to an unlocked state in which the extender is logically unlocked from the host router. Here, the secret session key may be erased or deleted from memory. In the unlocked state, after router disconnection, the extender may permit subsequent router acquisition upon reconnection without verification of authentication data using the old, secret session key. Rather, in some implementations, in the unlocked state, the extender may permit subsequent router acquisition upon reconnection based again on the verification of the extender information (e.g. the extender information and/or the SIM information).

Again, in some implementations, the information to be verified prior to locking may be or include information associated with the extender ("extender information") and information associated with the SIM ("SIM information"). The extender information may be or include an International Mobile Equipment Identity (IMEI). The SIM information may be or include one or more of an International Mobile Subscriber Identity (IMSI), an Integrated Circuit Card ID (ICCID), and a Card Holder Verification 1 (CHV1). Here, the extender may verify the information in step 306 by verifying that a received IMEI matches the IMEI of the extender. Also, the extender may verify the information in step 306 by verifying that a received IMSI, ICCID, and/or CHV1 matches the IMSI, ICCID, and/or CHV1 associated with the SIM. Note that, when setting the extender in the locked state, the extender may lock the SIM using the CHV1.

In some implementations, the stored secret session key may be calculated as a function of one or more data items which include a device certificate associated with the host router, the IMEI of the extender, the IMSI of the SIM, and the ICCID of the SIM.

In some implementations, the pairing process may involve performing a trust establishment process in response to receiving a request for pairing from the host router. Here, the extender may participate in an exchange of device certificates with the host router and establish trust based on the device certificate of the host router. The secure encrypted channel may be established with the host router in response to establishing trust based on the device certificate. Here, the device certificates may be Secure Unique Device Identifier (SUDI) certificates.

Figure 3B:
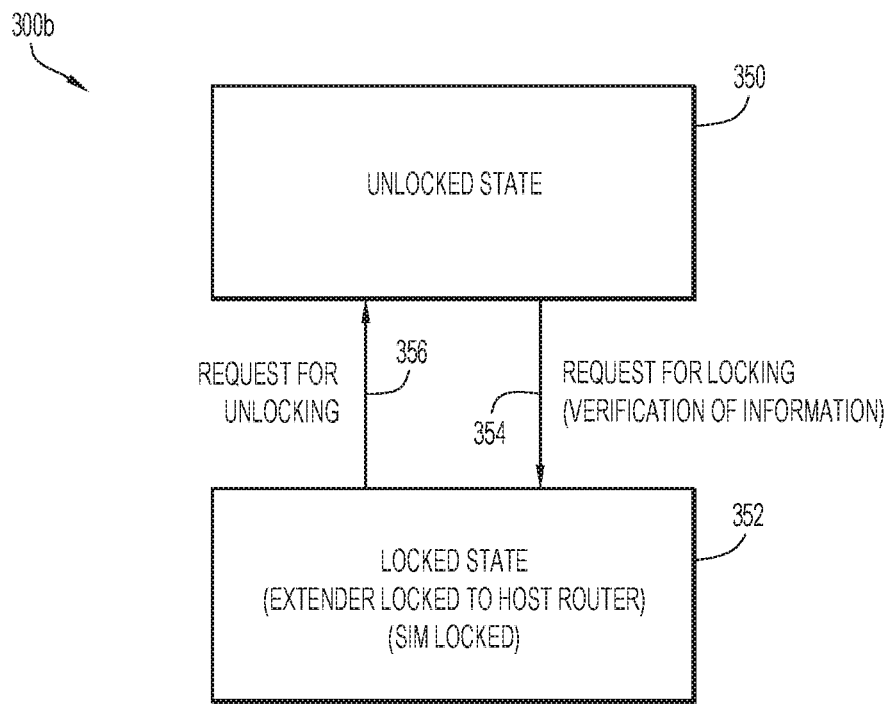
FIG. 3B is an operating state diagram of basic operating states of a mobile network extender in a standalone configuration according to some implementations of the present disclosure.

FIG. 3B is an operating state diagram 300b of a mobile network extender according to some implementations of the present disclosure. Operating state diagram 300b indicates a plurality of basic operating states of the extender in a standalone configuration with a host router.

The operating states may include an unlocked state 350 and a locked state 352. A transition 354 from the unlocked state 350 to the locked state 352 may be made in response to receiving a request for locking with a host router and verifying information (e.g. extender and SIM information) from the host router. In the locked state 352, the extender may be logically locked for (e.g. exclusive) use with the host router. Also, the SIM associated with the extender may be locked.

In the locked state 352, the extender may or may not be physically connected to the host router (e.g. via the Ethernet connection). If the extender is connected to the host router, the extender may be in an acquired state for facilitating communications via the wireless link, where the extender is considered to be "online"; otherwise, the extender may be considered to be disconnected and "offline."

In the locked state 352, the host router may have the proper authentication data (e.g. the secret session key) stored in memory. Here, after router disconnection, the extender may permit or deny subsequent router acquisition upon router reconnection based on verifying, using the stored secret session key, authentication data received via the network interface (e.g. the secret session key received from the same host router).

A transition 356 from the locked state 352 to the unlocked state 350 may be made in response to receiving a request for unlocking the extender from the host router. The unlocking of the extender may erase or delete the secret session key from memory.

Figure 3C:
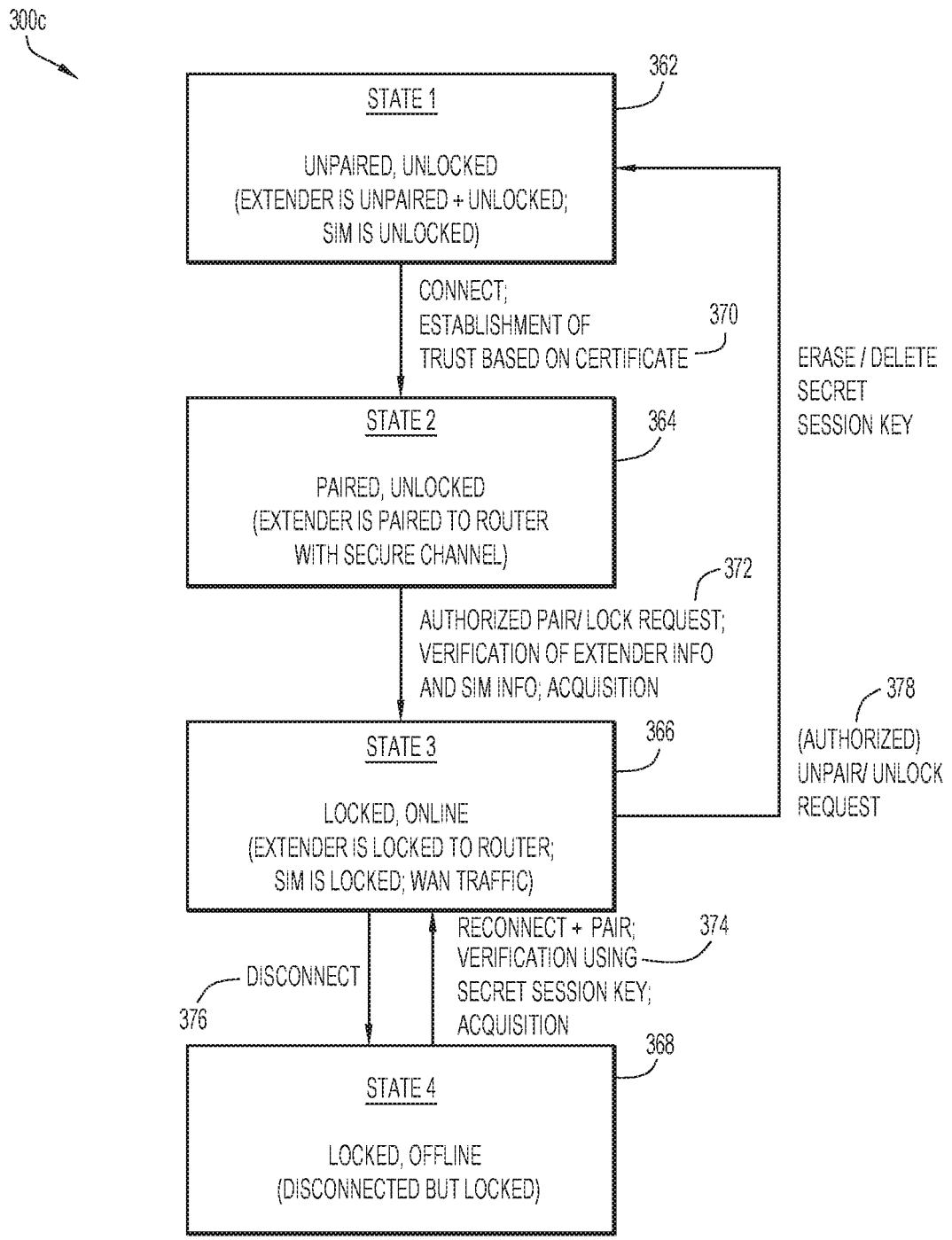
FIG. 3C is a more detailed operating state diagram of operating states of a mobile network extender in a standalone configuration according to some implementations of the present disclosure.

FIG. 3C is a more detailed operating state diagram 300c of a mobile network extender according to some implementations of the present disclosure. Operating state diagram 300c indicates a plurality of operating states 362, 364, 366, and 368 of the extender for a standalone configuration with a host router. Other operating states may also exist and be realized. Operating state diagram 300c may involve similar operating states and operation as those previously described above in relation to FIG. 3B, and are not repeated here for conciseness.

State 362 ("State 1") may be an unpaired and unlocked state, state 364 ("State 2") may be a paired and unlocked state, state 366 ("State 3") may be a locked and online state, and state 368 ("State 4") may be a locked and offline state. In state 362 (unpaired, unlocked), the extender may be unpaired and unlocked. Also, the SIM of the extender may be unlocked. A transition 370 from state 362 (unpaired, unlocked) to state 364 (paired, unlocked) may be made after connection with a host router, and in response to a pairing request and the establishment of trust based on a device certificate of the host router. State 364 (paired, unlocked) may include the maintenance of a secure encrypted channel with the host router.

A transition 372 from state 364 (paired, unlocked) to state 366 (locked, online) may be made in response to a pairing/locking request, the verification of information (e.g. extender information and SIM information) from a host router, and extender acquisition. In state 366 (locked, online), the extender may be logically locked for (e.g. exclusive) use with the host router. Also, the SIM associated with the extender may be locked. Also, the extender has been acquired for use of the wireless link for WAN traffic and is "online."

A transition 376 from state 366 (locked, online) to state 368 (locked, offline) may be made in response to the extender and host router being disconnected from each other. In state 368 (locked, offline), the extender is disconnected and offline, but still logically locked to the host router. Although disconnected from the extender, the host router (e.g. and only this host router) may store the proper authentication data (e.g. the secret session key) in its memory, to be able to subsequently acquire the extender for communications via the wireless link. In state 368 (locked, offline), the extender may permit or deny subsequent router acquisition upon the router reconnection based on verifying, using the secret session key, authentication data received via the network interface. Accordingly, a transition 374 from state 368 (locked, offline) to state 366 (locked, online) may be made after reconnection and pairing, in response to the verification of authentication data using the stored secret session key.

A transition 378 from state 366 (locked, online) to state 362 (unpaired, unlocked) may be made in response to the receipt of an (authorized) unpairing/unlocking request from the host router. Here, the secret session key may be erased or deleted from memory. In state 362 (unpaired, unlocked), the extender is unpaired and unlocked from the host router. In the state 362 (unpaired, unlocked), the extender may permit subsequent router acquisition upon reconnection and re-pairing based on verifying of extender information (e.g. the extender information and/or the SIM information).

FIGS. 4A-4F are process flow diagrams for use in describing methods for use in providing security protection to prevent unauthorized use of a mobile network extender according to some implementations of the present disclosure. These process flow diagrams relate to an extender having a standalone configuration with a host router.

Figure 4A:
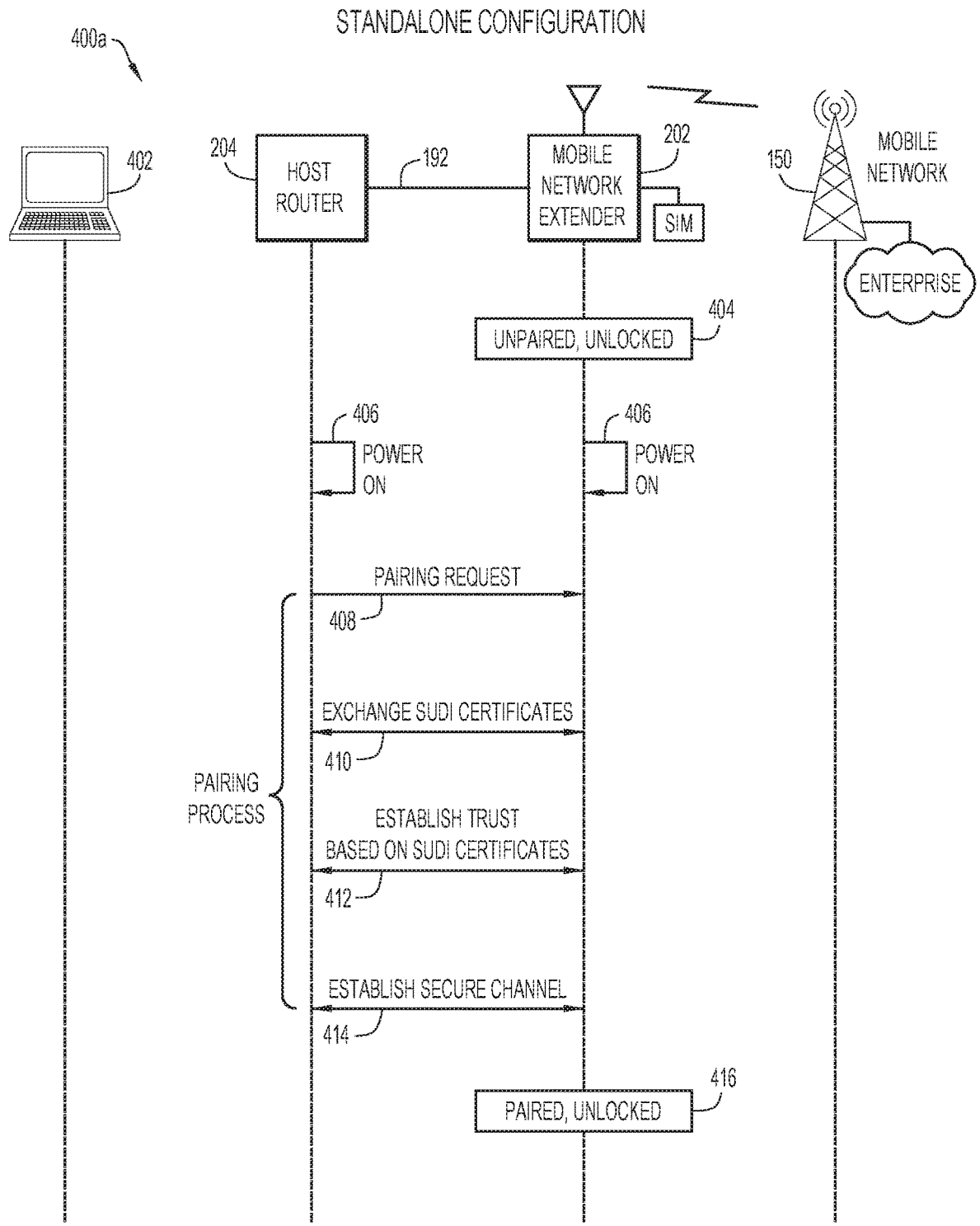
FIGS. 4A-4F are process flow diagrams for use in describing methods for use in providing security protection to prevent unauthorized use of a mobile network extender, in a standalone configuration, according to some implementations of the present disclosure.

Beginning with a process flow diagram 400a of FIG. 4A, the extender 202 may be in a state which includes an unpaired, unlocked state 404. The extender 202 and the host router 204 may be connected to each other and powered on (step 406 of FIG. 4A). Host router 204 may send to extender 202 one or more messages which indicate a request for pairing (step 408 of FIG. 4A). In response, the extender 202 and host router 204 may exchange device certificates with each other (step 410 of FIG. 4A). In some implementations, the device certificates may be SUDI certificates. The extender 202 and host router 204 may establish trust with each other based on the device certificates (step 412 of FIG. 4A). In a response to mutually establishing trust, the extender 202 and host router establish a secure encrypted channel therebetween for communications (step 414 of FIG. 4A). Now, the extender 202 may be in a state which includes a paired, unlocked state 416.

Figure 4B:
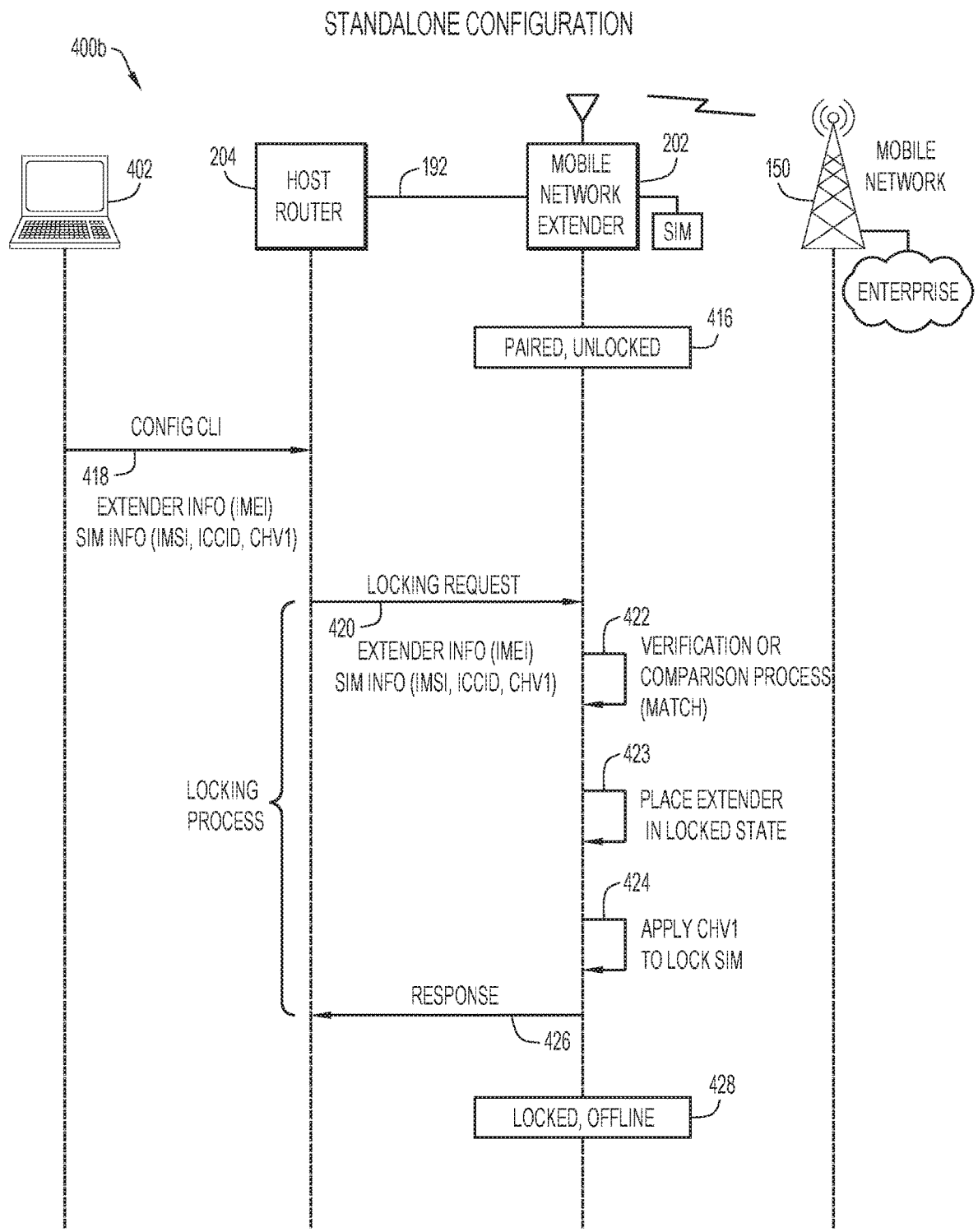

Continuing with a process flow diagram 400b of FIG. 4B, the extender 202 is in the state which includes the paired, unlocked state 416. A computer or suitable host 402 may be used to initiate a locking request for locking the extender 202 to the host router 204. Here, host 402 may configure a command line interface (CLI), sending one or more messages to host router 204 for locking (step 418 of FIG. 4B). The one or more messages may include information for the host router 204. The information may be information associated with the extender 202 ("extender information") and information associated with the SIM ("SIM information") of the extender 202. The extender information may be or include IMEI which identifies the extender 202. The SIM information may be or include one or more of IMSI, ICCID, and a CHV1. In response, host router 204 may send to the extender 202, over the secure encrypted channel, one or more messages which indicate a request for locking (step 420 of FIG. 4B). The one or more messages may include the information for verification (e.g. the extender and/or the SIM information). In response, the extender 202 may verify the information (step 422 of FIG. 4B). In particular, the extender 202 may verify the extender information, for example, that the received IMEI matches the IMEI of the extender. Also, the extender may verify the SIM information, for example, that the received IMSI, ICCID, and/or CHV1 match the known IMSI, ICCID, and/or CHV1 associated with the SIM.

Based on a matching of this information, the extender 202 may be set in a locked state (step 423 of FIG. 4B). In the locked state, the extended may be logically locked for (exclusive) use with the host router. In addition, the extender 202 may lock the SIM (step 424 of FIG. 4B). In step 424, the extender 202 may apply the CHV1 to lock the SIM. Thus, the SIM is now locked. When the verification is successful and completed, the extender 202 may send to host router 204 one or more messages indicating a (positive) response or acknowledgement (ACK) (step 426 of FIG. 4B). Otherwise, based on a lack of verification, the extender 202 may send one or more messages indicating a negative response or negative ACK (NACK). The extender 202 is now in a state which includes a locked, offline state 428.

Figure 4C:
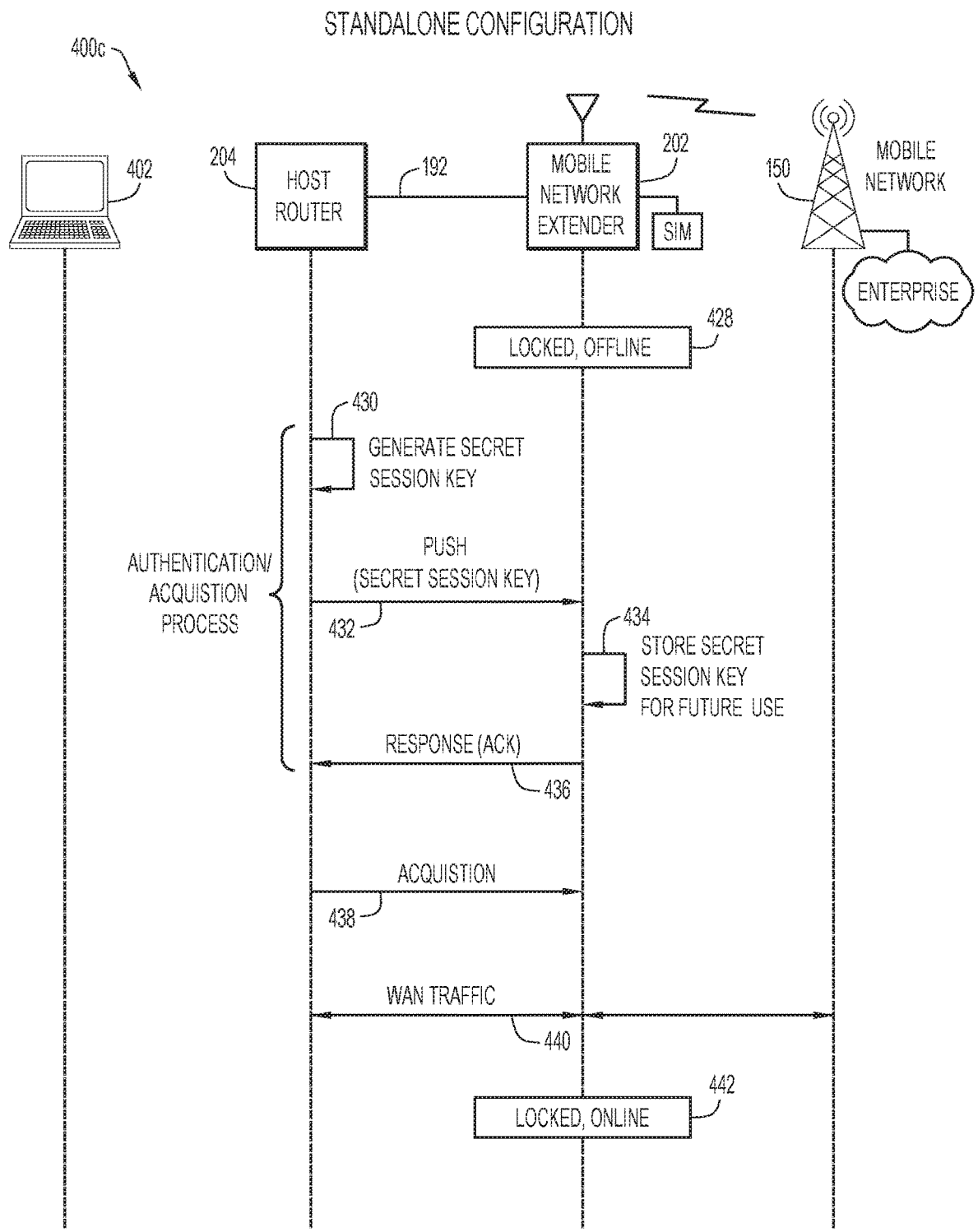

Continuing with a process flow diagram 400c of FIG. 4C, the extender 202 is in the state which includes the locked, offline state 428. The host router 204 may now acquire the extender 202 for communications via the wireless link. Prior to this occurring, host router 204 may generate a secret session key (step 430 of FIG. 4C). The secret session key may be calculated as a function of one or more data items which include the device certificate (e.g. the SUDI certificate) associated with the host router, the IMEI of the extender, the IMSI of the SIM, and/or the ICCID of the SIM. The host router 204 may send to the extender 202, over the secure encrypted channel, one or more messages for pushing the secret session key that was generated in step 430 (step 432 of FIG. 4C). In response to receiving the secret session key, the extender 202 may store the secret session key (e.g. for future use) (step 434 of FIG. 4C). The extender 202 may then send to host router 204 one or more messages which indicate a response or ACK (step 436 of FIG. 4C). The host router 204 may then send to extender 202 one or more messages for acquiring the extender 202 for communicating via the wireless link (step 438 of FIG. 4C). After acquisition, WAN traffic may be communicated (step 440 of FIG. 4C). The extender 202 is now in a state which includes a locked, online state 442.

Figure 4D:
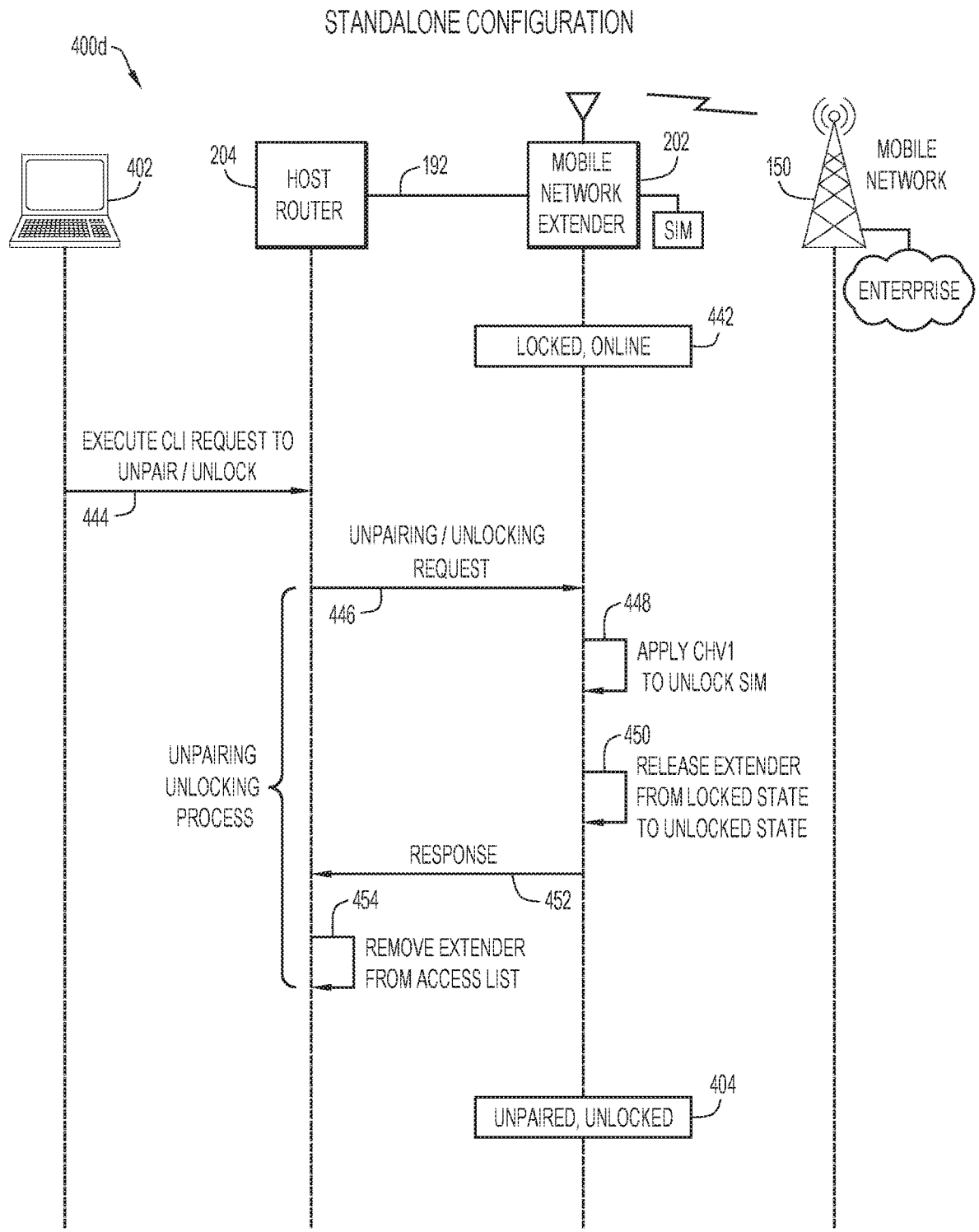

Continuing with a process flow diagram 400d of FIG. 4D, the extender 202 is in the state which includes the locked, online state 442. The computer or host 402 may be used to initiate a request for unpairing/unlocking for unlocking the extender 202 from the host router 204. Here, host 402 may execute CLI, sending one or more messages to host router 204 to request the unlocking/unpairing (step 444 of FIG. 4D). In response, host router 204 may send to the extender 202, over the secure encrypted channel, one or more messages which indicate a request for unpairing/unlocking (step 446 of FIG. 4D). In response, extender 202 may perform an unlocking process. For one, the extender 202 may unlock the SIM (step 448 of FIG. 4D). Here, extender 202 may use the CHVI to unlock the SIM. Also, extender 202 may be set from the locked state to an unlocked state (step 450 of FIG. 4D). If successful, the extender 202 may send to host router 204 one or more messages indicating a (positive) response or ACK (step 452 of FIG. 4D). Otherwise, the extender 202 may send one or more messages indicating a negative response or NACK. Host router 402 may remove extender information of the extender 202 from its access list (step 454 of FIG. 4D). The extender 202 is now in a state which includes the unpaired, unlocked state 404.

Figure 4E:
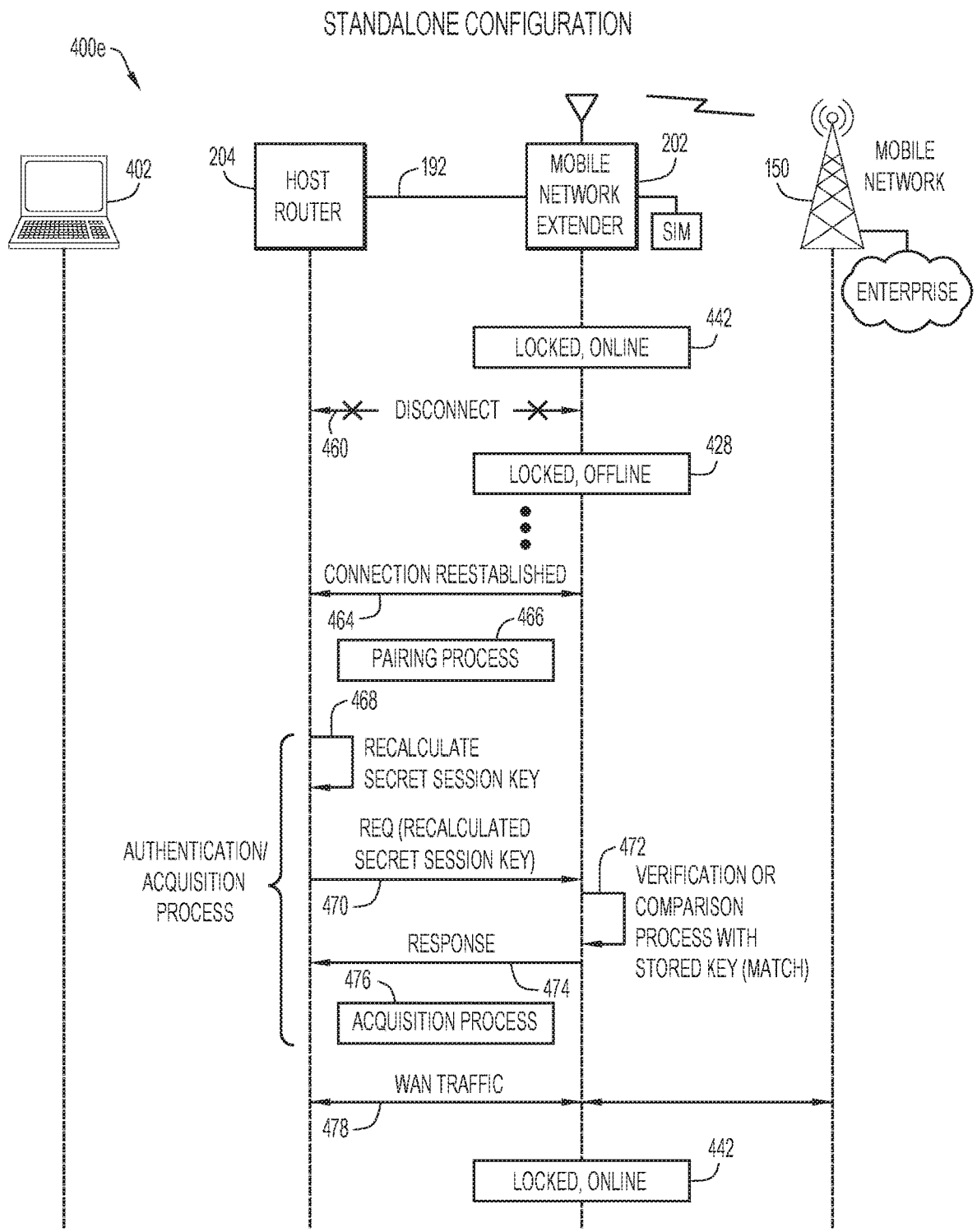

Continuing with a process flow diagram 400e of FIG. 4E, the extender 202 is in the state which includes the locked, online state 442 (as acquired in, for example, FIG. 4C). However, the extender 202 and the host router 204 may be disconnected from each other (step 460 of FIG. 4E). This disconnection may be, for example, an intentional disconnection, a cable fault, an extender "crash," etc. The extender 202 is now in a state which includes the locked, offline state 428. Sometime later, the connection between the extender 202 and the host router 204 is reestablished (step 464 of FIG. 4E). A pairing process between the extender 202 and the host router 204 is performed (step 466 of FIG. 4E), for again establishing the secure encrypted channel. Host router 204 may also recalculate the secret session key (step 468 of FIG. 4E). Again, the secret session key may be calculated as a function of one or more data items which include the device certificate (e.g. the SUDI certificate) associated with the host router, the IMEI of the extender, the IMSI of the SIM, and/or the ICCID of the SIM.

The host router 204 may then send to the extender 202, over the secure encrypted channel, one or more messages which indicate a request (step 470 of FIG. 4E). The one or more messages may include the secret session key, generated in step 468. The information generated and sent to the extender 202 may be more generally referred to as authentication data. In response to receiving the request and associated authentication data (e.g. the secret session key), the extender 202 may verify the authentication data (step 472 of FIG. 4E). More particularly, the extender 202 may compare the received authentication data and the stored secret session key to identify a match. The extender 202 may then send to host router 204 one or more messages which indicate a positive response or ACK (step 474 of FIG. 4E). Otherwise, the extender 202 may send one or more messages indicating a negative response or NACK. The host router 204 may perform an acquisition process for communicating via the wireless link (step 476 of FIG. 4E). After acquisition, WAN traffic may be communicated (step 478 of FIG. 4E). The extender 202 is now in a state which includes the locked, online state 442.

Figure 4F:
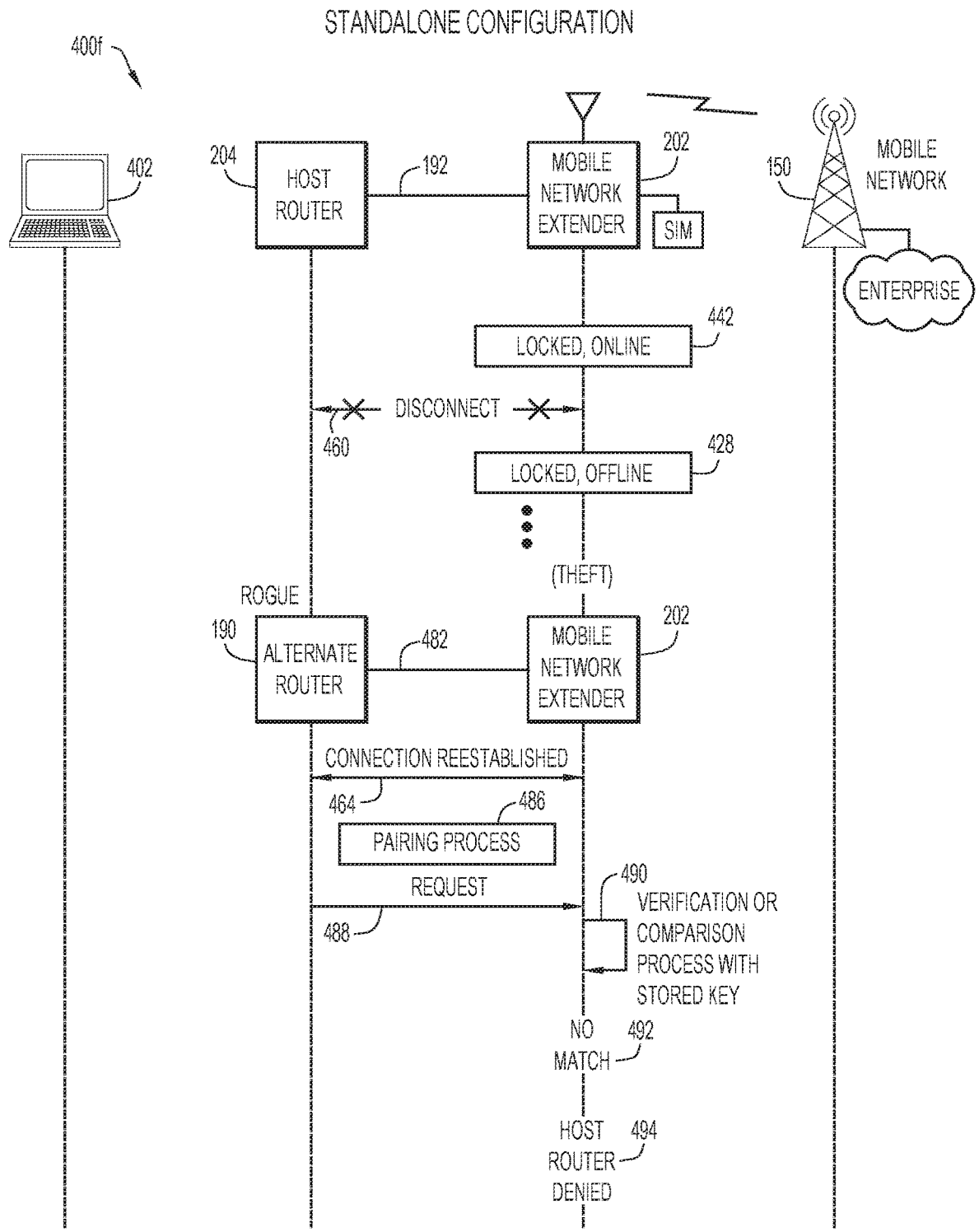

Continuing with a process flow diagram 400f of FIG. 4F, the extender 202 is in the state which includes the locked, online state 442 (as acquired in, for example, FIG. 4C). However, the extender 202 and the host router 204 may be disconnected from each other (step 460 of FIG. 4F). The extender 202 is now in a state which includes the locked, offline state 428. The disconnection may be, for example, an intentional disconnection, a cable fault, an extender "crash," etc. In this example, the disconnection is the result of a theft of the extender 202, where the extender 202 is intentionally, physically disconnected from the host router 204.

Sometime later, a new (physical) connection 482 between the extender 202 and alternate host router 190 (e.g. of the same or similar make and construction as the previous host router 204) is made, and connectivity therebetween is established (step 464 of FIG. 4F). A pairing process between the extender 202 and alternate host router 190 may be performed (step 486 of FIG. 4F). Also, the alternate host router 190 may send to extender 202 one or more messages which indicate a request, such as an acquisition request (step 488 of FIG. 4F).

As the extender 202 is in the locked state with a different host router, alternate host router 190 would need to have the proper authentication data for authentication (e.g. the secret session key) for acquiring the extender 202 for communications via the wireless link. In this example, alternate host router 190 does not have the proper data for authentication (e.g. the stored secret key). The extender 202 may attempt to verify (any) data received from alternate host router 190 in a comparison process (step 490 of FIG. 4F), identify that there is no match (step 492 of FIG. 4F), and deny the alternate host router 190 from acquiring the extender 202 for communications via the wireless link (step 494 of FIG. 4F).

Figure 5:
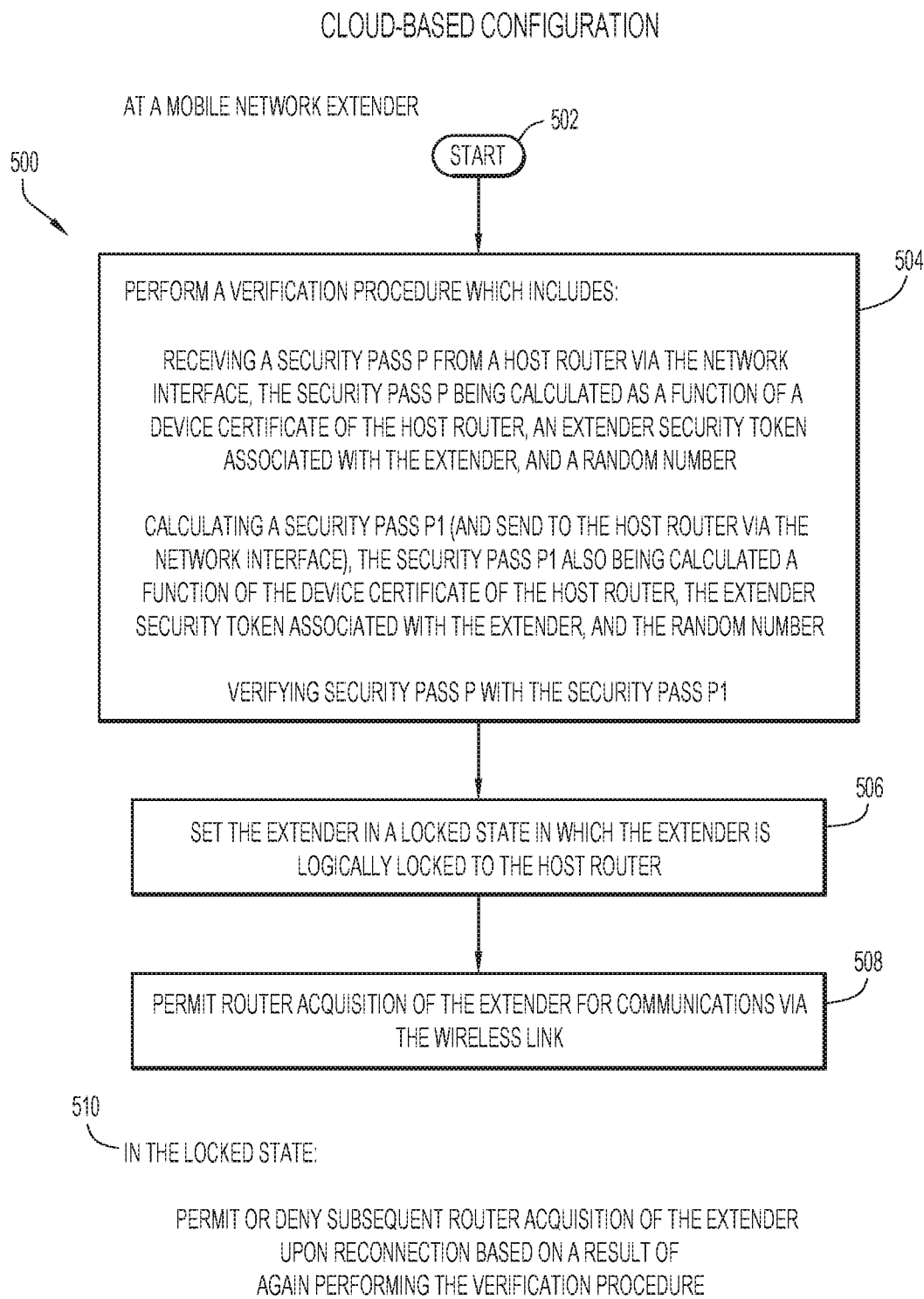
FIG. 5 is a flowchart for describing a method for use in providing security protection to prevent unauthorized use of a mobile network extender, in a cloud-based configuration, according to some implementations of the present disclosure.

FIG. 5 is a flowchart 500 for describing a method of providing security protection to prevent unauthorized use of a mobile network extender according to some implementations of the present disclosure. The extender may include a network interface configured to connect with a host router and a cellular modem configured to provide a wireless link for communications via a cellular mobile network. The cellular modem may include one or more SIM interfaces each configured to receive a SIM. The extender may include one or more processors and memory coupled to the one or more processors. The method may be embodied as a computer program product including a non-transitory computer readable medium and instructions stored in the computer readable medium, where the instructions are executable on one or more processors of the extender for performing the steps of the method.

The method of FIG. 5 involves the extender being used in a "cloud-based configuration" with the host router. In the cloud-based configuration, the host router may have a primary WAN link for primary use and intend to use the extender as a backup WAN link. In order to access the cloud server, the host router may use its primary WAN link and the extender may use its wireless link with the cellular mobile network.

Beginning at a start block 502 of FIG. 5, the extender may perform a verification procedure in association with the host router (step 504 of FIG. 5). The verification procedure may involve the following steps. For one, the extender may receive a security pass P from the host router via the network interface. At the host router, the security pass P may be calculated a function of the device certificate of the host router, an extender security token associated with the extender, and a router-selected, random number or RAND. The extender may also calculate a "cross-reference" security pass P1 as a function of the device certificate of the host router, the extender security token associated with the extender, and the RAND received from the host router. The extender may verify the received security pass P based on the calculated security pass P1. For example, the extender may positively verify that the security pass P matches the security pass P1.

Prior to the above, a cloud server may be used to generate and distribute the extender security token. Here, the cloud server may implement a lightweight machine-to-machine (LWM2M) or other suitable service. The cloud server may generate the extender security token based on information associated with and received from the extender. In some implementations, the cloud server may generate the extender security token based on extender information, such as the IMEI and/or the SUDI of the extender. After generating the extender security token, the cloud server may send the extender security token to both the extender and the host router. The cloud server may also receive the router SUDI from the host router and send the router SUDI to the extender. After this information is received, the security passes may be appropriately calculated by the host router and the extender as described earlier above.

In response to a positive verification of the security pass P, the extender may be set in a locked state in which the extender is logically locked to the host router (step 506 of FIG. 5). The extender may also lock a SIM connected at the SIM interface. The extender may then permit the host router to acquire the extender for communications via the wireless link (step 508 of FIG. 5). In the locked state, subsequent router acquisition of the extender upon router reconnection may be permitted or denied based on a result of again performing the verification procedure (indication 510 of FIG. 5). Here, for example, the extender may permit subsequent router acquisition upon router reconnection based on verifying a match between the security pass and the cross-reference security pass, and deny subsequent router acquisition upon router reconnection if the security pass fails to match the cross-reference security pass.

Subsequently, the extender may be unlocked. In response to receiving, from the host router, one or more messages indicating a request for unlocking the router, the extender may again perform the verification procedure with the host router based on the security pass P. Based on verifying the received security pass, the extender may be set from the locked state to an unlocked state in which the extender is logically unlocked from the host router.

FIGS. 6A-6D are process flow diagrams for use in describing methods for use in providing security protection to prevent unauthorized use of a mobile network extender according to some implementations of the present disclosure. These process flow diagrams relate to an extender having a cloud-based configuration with a host router. Here, the locking and unlocking processes may be facilitated with use of one or more cloud servers (e.g. using LWM2M or other suitable cloud service). The cloud-based configuration may assume that the host router 204 already has a primary WAN link, which will be used to access the cloud server, and intends to use the extender 202 as a backup WAN link.

Figure 6A:
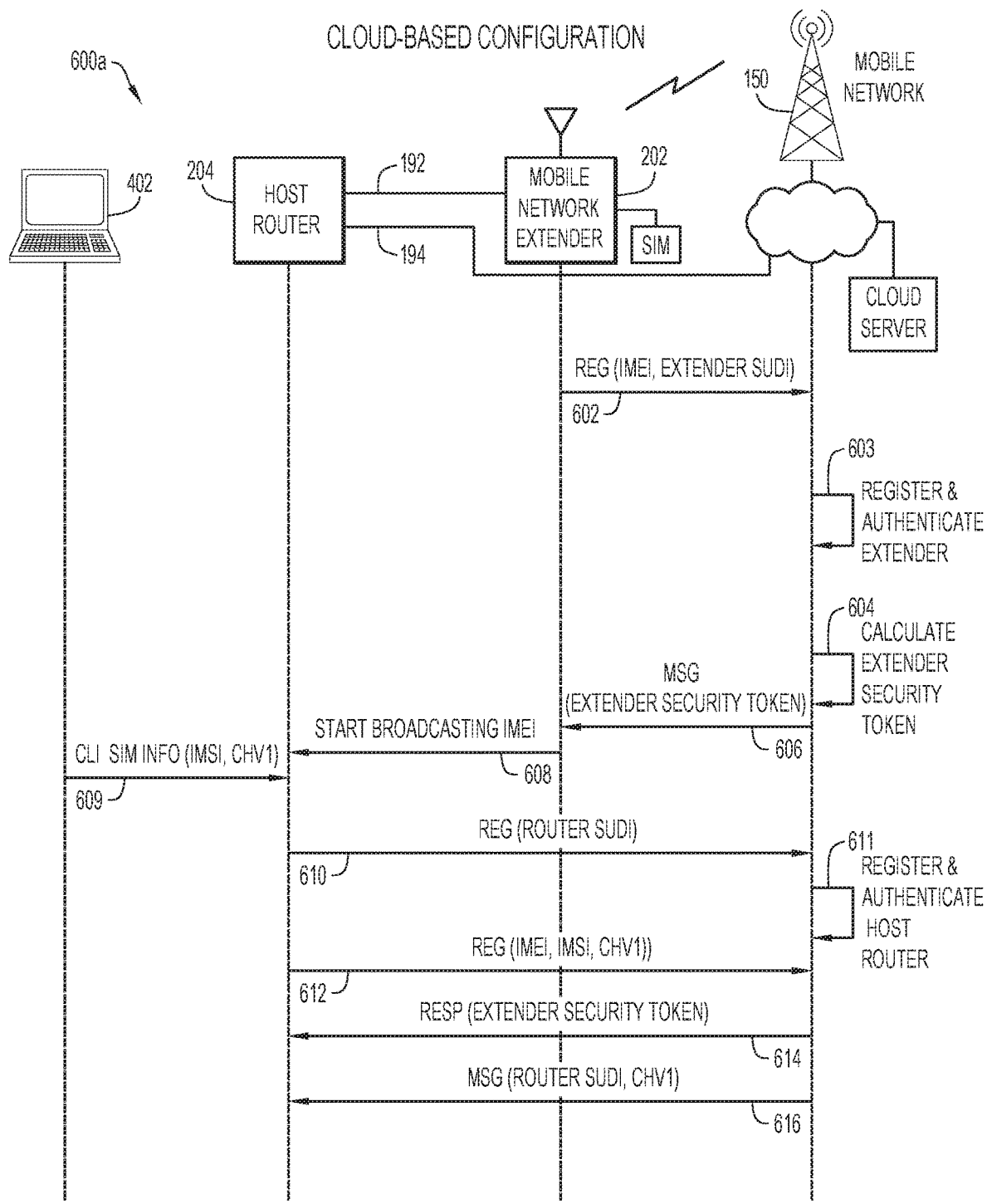
FIGS. 6A-6D are process flow diagrams for use in describing methods for use in providing security protection to prevent unauthorized use of a mobile network extender, in a cloud-based configuration, according to some implementations of the present disclosure.

Beginning with a process flow diagram 600a of FIG. 6A, the extender 202 be use its cellular modem to register to the mobile network 150 and to access the cloud server (step 602 of FIG. 6A). The extender 202 may send to the cloud server one or more messages which include extender information. The extender information may include the device certificate (e.g. SUDI certificate) of extender 202 and the IMEI of the extender 202. The extender information may further include the IMSI, the ICCID, and the CHV1 associated with a SIM. The cloud server may register and authenticate the extender 202 based on the device certificate of the extender 202 (step 603 of FIG. 6A). The cloud server may calculate a security token associated with the extender (step 604 of FIG. 6A). The extender security token may be calculated based on at least some of the extender information. For example, the extender security token may be calculated as a function of the device certificate of the extender 202, the IMEI, the IMSI, the ICCID, and the CHV1 (see e.g. FIG. 6D at a calculation 670 for the extender security token).

The cloud server may send to the extender 202 one or more messages indicating a response which includes the extender security token (step 606 of FIG. 6A). In response, the extender 202 may start to regularly broadcast its IMEI (step 608 of FIG. 6A). As the extender 202 is connected to host router 402, the host router 402 will receive the broadcasted IMEI of the extender 202. In some implementations, extender 202 could be connected to an ethernet switch or the like, where one or more hosts may be listening and receiving the broadcasted IMEI.

Continuing with process flow diagram 600a, the computer or host 402 may execute CLI, sending one or more messages to host router 204 which includes SIM information of the SIM of the extender 202 (step 609 of FIG. 6A). The SIM information may include the IMSI and the CHV1 of the SIM. The host router 204 may then proceed to register with the cloud server (e.g. connecting to the cloud server with its primary WAN link) (step 610 of FIG. 6A). The host router 204 may register with its device certificate (e.g. SUDI certificate). The cloud server may register and authenticate the host router 204 based on the device certificate (step 611 of FIG. 6A). The host router 402 may then send to the cloud server one or more messages indicate a request for pairing/locking with the extender 202 (step 612 of FIG. 6A). The one or more messages may include information associated with the extender 202 that it desires to pair and lock with, namely, extender information and SIM information of the extender 202. The extender information may include the IMEI of the extender 202 and the SIM information of the SIM may include the IMSI and the CHV1. In response, the cloud server may process the request and send to host router 204 one or more messages indicating a response which includes the extender security token (step 614 of FIG. 6A). In addition, the cloud server may also send to the extender 202 to be paired/locked one or more messages which include the device certificate of the host router 204 and the CHVI of the SIM.

Now, the host router 204 and the extender 202 are properly pre-configured to for pairing and locking. Notably, both the host router 204 and the extender 202 have the extender security token. Continuing at a process flow diagram 600b of FIG. 6B, the host router 204 may send to extender 202 one or more messages which indicate a request for pairing/locking (step 617 of FIG. 6B). A verification procedure which may involve the following steps between the host router 204 and the extender 202 may be performed. For one, the host router 204 may calculate a security pass P (step 618 of FIG. 6B). The security pass P may be calculated as a function of the device certificate of the host router 204, the extender security token, as well as a router-selected, random number (RAND) (see e.g. FIG. 6D at a calculation 680 for the security pass P). The host router 204 may send to extender 202 one or more messages which include the security pass P and the RAND (step 620 of FIG. 6B). In response, the extender 202 may also calculate a "cross-reference" security pass P1 (step 622 of FIG. 6B). This security pass P1 is also calculated as a function of the device certificate of the host router 204, the extender security token, and the received RAND (see e.g. FIG. 6D at a calculation 682 for the cross-reference security pass P1). The extender 202 may send to the host router 204 one or more messages which include the calculated security pass P1.

Figure 6B:
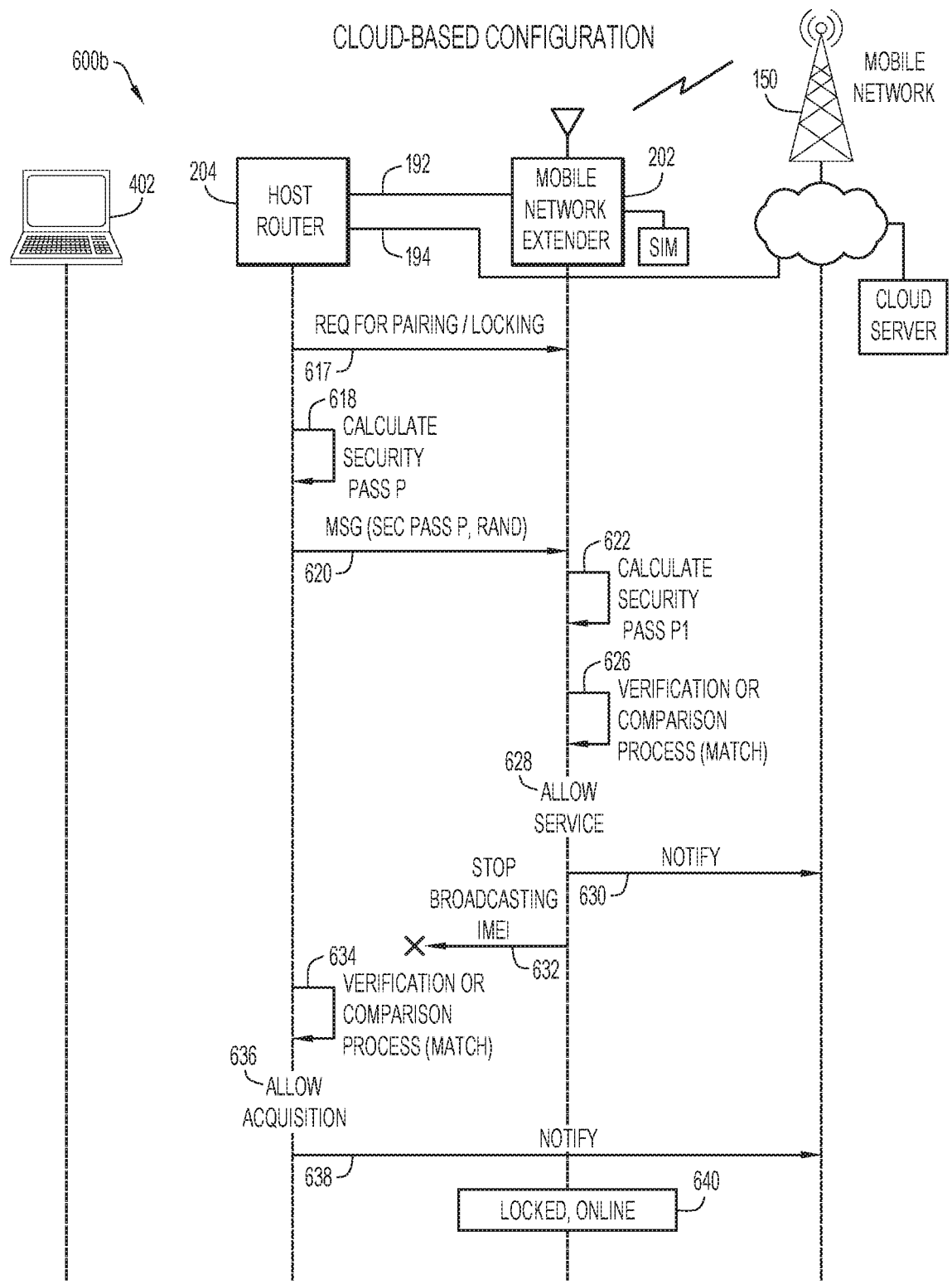

The extender 202 may verify the received security pass P with the calculated security pass P1 (step 626 of FIG. 6B). For example, the extender 202 may verify whether the received security pass P matches the calculated security pass P1. If there is a match, the extender 202 will allow service and acquisition by the host router 204 (step 628 of FIG. 6B). The extender 202 may notify the cloud server of this result (step 630 of FIG. 6B), and also cease the regular broadcasting of its IMEI (step 632 of FIG. 6B).

In addition, the host router 204 may verify its received security pass P1 with its calculated security pass P (step 634 of FIG. 6B). For example, the host router 204 may verify whether its received security pass P1 matches its calculated security pass P. If there is a match, the host router 204 will allow itself to acquire the extender 202 for communicating via the wireless link (step 636 of FIG. 6B). The host router 204 will notify the cloud server of this result (step 638 of FIG. 6B). After acquisition, WAN traffic may be communicated. The extender 202 is now in a state which includes a locked, online state 640.

Figure 6C:
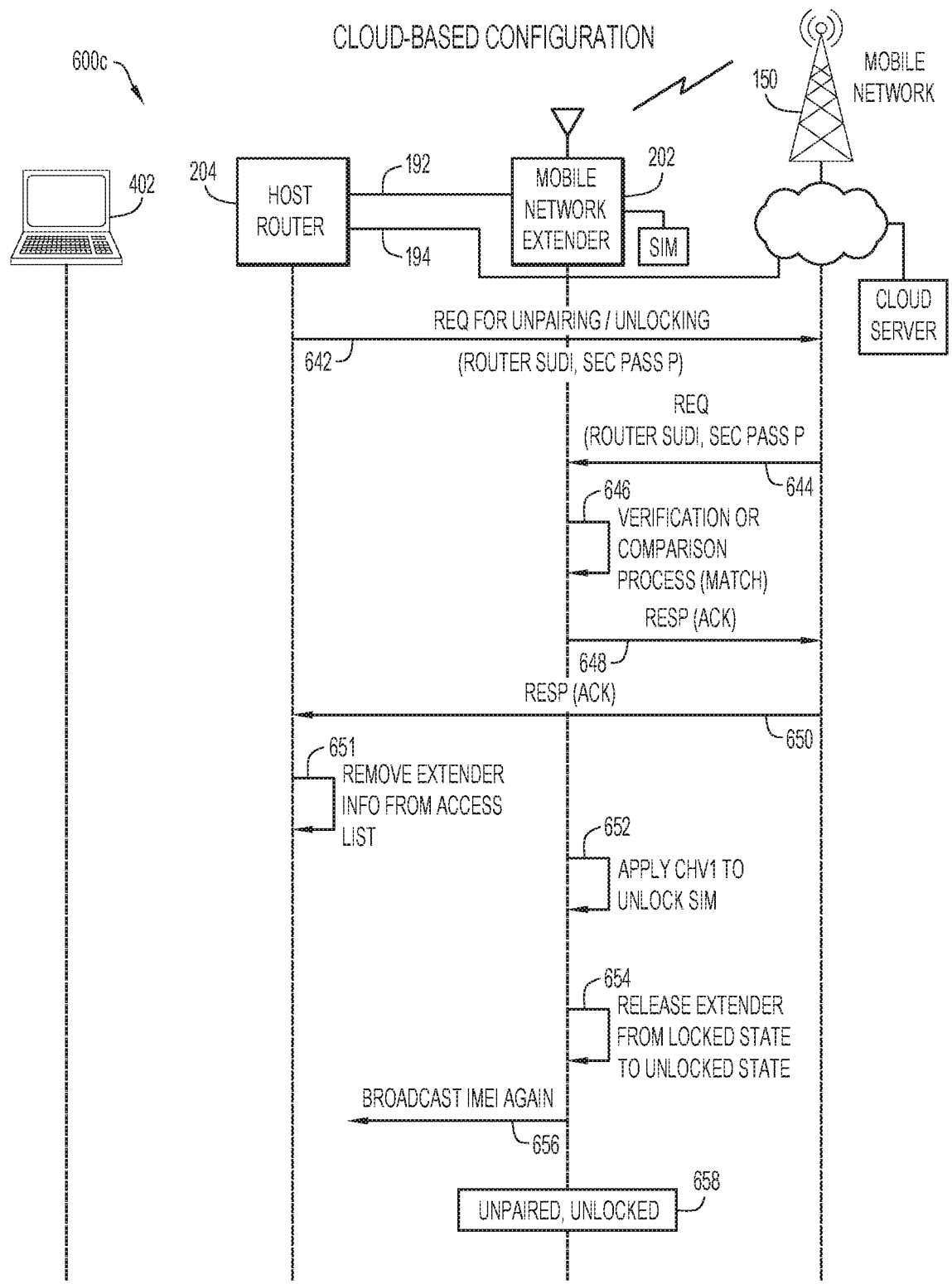
Figure 6D:
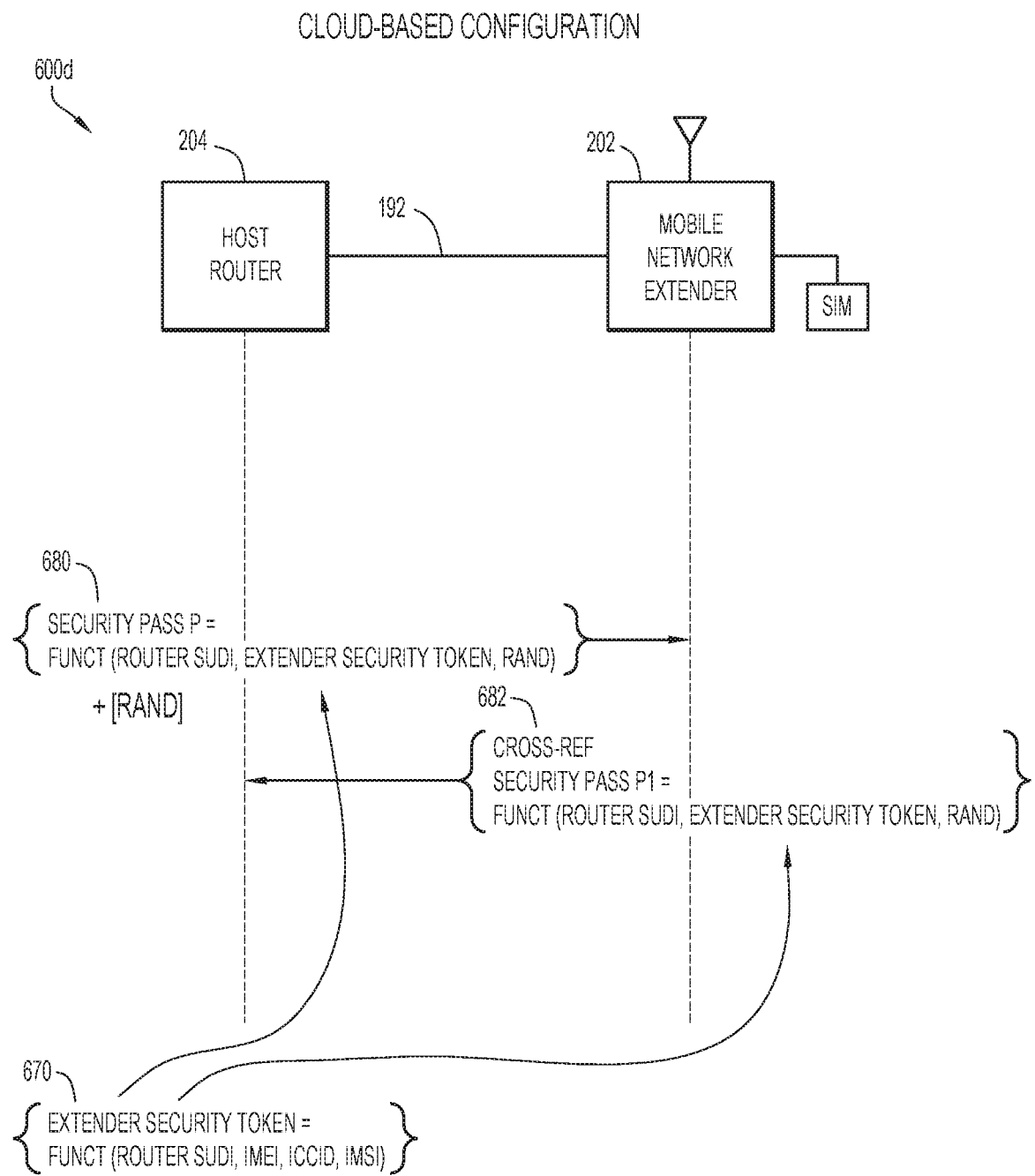

Continuing at a process flow diagram 600c of FIG. 6C, the host router 204 may send to the cloud server one or more messages which indicate a request for unpairing/unlocking (step 642 of FIG. 6C). The one or more messages may include the device certificate of the host router 204 and the security pass P. In turn, the cloud server may send to extender 202 one or more messages indicating a request for unpairing/unlocking (step 644 of FIG. 6C). The one or more messages may include the device certificate of the host router 204 and the security pass P. The extender 202 may then verify the received security pass P with its own calculated security pass P1 (step 646 of FIG. 6C). For example, the extender 202 may verify whether its received security pass P matches its calculated security pass P1. If there is a match, the extender 202 will notify the cloud server of this result (a response or ACK) (step 648 of FIG. 6C), which will in turn notify the host router 204 of this result (step 650 of FIG. 6C). In response, host router 204 may remove extender information of the extender 202 from its access list (step 651 of FIG. 6C). Also in response to the verification, the extender 202 will perform an unlocking process. For one, the extender 202 may unlock the SIM (step 652 of FIG. 6C). Here, extender 202 may use the CHVI to unlock the SIM. Also, extender 202 may be set from the locked state to an unlocked state (step 654 of FIG. 6C). The extender 202 may begin to again regularly broadcast its IMEI for any new host router to receive (step 656 of FIG. 6C). The extender 202 is now in a state which includes an unpair, unlocked state 658.

Thus, techniques for security protection to prevent unauthorized use of mobile network extenders have been described. An extender of the present disclosure may be set in a locked state in which the extender is logically locked for (exclusive) use with a host router, until it has been unlocked by the same host router or other authorized means. Advantageously, unauthorized access to a private network due to theft of the extender may be prevented, further preventing cybersecurity (e.g. malware) attacks in the private network.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first router could be termed a second router, and similarly, a second router could be termed a first router, without changing the meaning of the description, so long as all occurrences of the "the first router" are renamed consistently and all occurrences of the "the second router" are renamed consistently. The first router and the second router are both routers, but they are not the same router.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a mobile network extender comprising a module which includes a network interface configured to connect with a host router of a private network and a cellular modem configured to provide a wireless link with a base station of a cellular mobile network to provide wide area network access for the private network via the host router, establishing a secure encrypted channel with the host router via the network interface;
based on verifying information received from the host router over the secure encrypted channel, setting the extender in a locked state in which the extender is logically locked to the host router;
receiving and storing a secret session key from the host router; and
permitting the host router to acquire the extender to provide the wide area network access for the private network via the wireless link,
wherein, in the locked state, permitting or denying subsequent router acquisition upon router reconnection with the extender is based on verifying, using the secret session key, authentication data received via the network interface.

2. The method of claim 1 wherein, in the locked state, permitting or denying subsequent router acquisition upon router reconnection further comprises:
permitting subsequent router acquisition upon router reconnection based on verifying that the authentication data matches the secret session key; and
denying subsequent router acquisition upon router reconnection if the authentication data fails to match the secret session key.

3. The method of claim 1, wherein the information comprises extender information, and wherein verifying the information comprises verifying that the extender information matches predetermined extender information associated with the extender.

4. The method of claim 3, wherein the predetermined extender information comprises an International Mobile Equipment Identity (IMEI) of the extender.

5. The method of claim 1, wherein the extender further comprises one or more subscriber identity module (SIM) interfaces, each SIM interface is configured to receive a SIM for use with the cellular modem, and the method further comprises:
based on verifying the information received from the host router over the secure encrypted channel, locking the SIM attached to one of the SIM interfaces.

6. The method of claim 5, wherein the information comprises SIM information, and wherein verifying the information comprises verifying that the SIM information matches predetermined SIM information associated with the SIM.

7. The method of claim 1, wherein the network interface of the extender comprises an Ethernet interface for an Ethernet connection to the host router, the method further comprising:
receiving, from the host router, one or more messages indicating a request for locking, the one or more messages including the information to be verified.

8. The method of claim 1, further comprising:
in response to receiving, from the host router, one or more messages indicating a request for unlocking the host router, setting the extender from the locked state to an unlocked state in which the extender is logically unlocked from the host router; and
wherein, in the unlocked state, permitting subsequent router acquisition upon router reconnection with the extender is based on verifying information received via the network interface without verifying authentication data using the secret session key.

9. The method of claim 1, further comprising:
in response to receiving, from the host router, one or more messages indicating a request for pairing:
exchanging device certificates with the host router via the network interface;
establishing trust based on a device certificate of the host router; and
establishing the secure encrypted channel with the host router in response to establishing the trust.

10. The method of claim 1, wherein:
the extender further comprises one or more subscriber identity module (SIM) interfaces;
the information comprises extender information and SIM information;
the extender information comprises an International Mobile Equipment Identity (IMEI) which identifies the extender;
the SIM information comprises one or more of an International Mobile Subscriber Identity (IMSI), an Integrated Circuit Card ID (ICCID), and a Card Holder Verification 1 (CHV1), which identifies a SIM attached to one of the SIM interfaces; and the method further comprising:
based on verifying the information received from the host router over the secure encrypted channel, setting the extender in the locked state and locking a SIM attached to a SIM interface using the CHV1.

11. The method of claim 5, further comprising:
in response to receiving, from the host router, one or more messages indicating a request for unlocking:
setting the extender from the locked state to an unlocked state in which the extender is logically unlocked; and
unlocking the SIM,
wherein, in the unlocked state, permitting subsequent router acquisition upon router reconnection with the extender is based on verifying information received over the network interface without verifying authentication data using the secret session key.

12. The method of claim 1, wherein the extender further comprises one or more subscriber identity module (SIM) interfaces, and wherein the secret session key is a function of one or more of a device certificate associated with the host router, an International Mobile Equipment Identity (IMEI) of the extender, an International Mobile Subscriber Identity (IMSI) of a SIM, and an Integrated Circuit Card ID (ICCID) of the SIM.

13. A mobile network extender comprising:
a module including one or more processors, a network interface configured to connect with a host router of a private network, and a cellular modem with an antenna;
the cellular modem with the antenna being configured to provide a wireless link with a base station of a cellular mobile network to provide wide area network access for the private network via the host router;
one or more Subscriber Identity Module (SIM) interfaces, each SIM interface being configured to receive a SIM for use with the cellular modem;
the one or more processors being configured to:
establish a secure encrypted channel with the host router via the network interface;
based on verifying information received from the host router over the secure encrypted channel, set the extender in a locked state in which the extender is logically locked to the host router;
receive and store a secret session key from the host router; and
permit the host router to acquire the extender to provide the wide area network access for the private network via the wireless link, wherein, in the locked state, permitting or denying subsequent router acquisition upon router reconnection with the extender is based on verifying, using the secret session key, authentication data received via the network interface.

14. The mobile network extender of claim 13, wherein the one or more processors are further configured to permit or deny subsequent router acquisition upon router reconnection by:
 permitting subsequent router acquisition upon router reconnection based on verifying that the information matches the secret session key; and
 denying subsequent router acquisition upon router reconnection if the information fails to match the secret session key.

15. The mobile network extender of claim 13, wherein:
 the one or more processors are further configured to, based on verifying the information received from the host router over the secure encrypted channel, set the extender in the locked state and locking the SIM.

16. The mobile network extender of claim 15, wherein the one or more processors are further configured to:
 in response to receiving, from the host router, one or more messages indicating a request for unlocking:
  setting the extender from the locked state to an unlocked state in which the extender is logically unlocked; and
  unlocking the SIM,
 wherein, in the unlocked state, permitting subsequent router acquisition upon router reconnection with the extender is based on verifying information received over the network interface without verifying authentication data using the secret session key.

17. A computer program product for a mobile network extender, the mobile network extender comprising a module including one or more processors, a network interface to connect with a host router of a private network, and a cellular modem to provide a wireless link with a base station of a cellular mobile network to provide wide area network access for the private network via the host router, the computer program product comprising:
 a non-transitory computer readable medium;
 instructions stored in the non-transitory computer readable medium, the instructions being executable on the one or more processors of the extender for:
  establishing a secure encrypted channel with a host router via the network interface;
  based on verifying information received from the host router over the secure encrypted channel, setting the extender in a locked state in which the extender is logically locked to the host router;
  receiving and storing a secret session key from the host router; and
  permitting the host router to acquire the extender to provide the wide area network access for the private network via the wireless link,
  wherein, in the locked state, permitting or denying subsequent router acquisition upon router reconnection with the extender is based on verifying, using the secret session key, authentication data received via the network interface.

18. The computer program product of claim 17, wherein the instructions are executable by the one or more processors of the extender further for:
 in the locked state, permitting or denying subsequent router acquisition upon router reconnection further by:
  permitting subsequent router acquisition upon router reconnection based on verifying that the authentication data matches the secret session key; and
  denying subsequent router acquisition upon router reconnection if the authentication data fails to match the secret session key.

19. The computer program product of claim 17, wherein the extender further comprises one or more Subscriber Identity Module (SIM) interfaces, each SIM interface is configured to receive a SIM for use with the cellular modem, and wherein:
 the information comprises extender information and SIM information;
 the extender information comprises an International Mobile Equipment Identity (IMEI);
 the SIM information comprises one or more of an International Mobile Subscriber Identity (IMSI), an Integrated Circuit Card ID (ICCID), and a Card Holder Verification 1 (CHV1); and
 the instructions are executable on the one or more processors of the extender further for, based on verifying the information received from the host router over the secure encrypted channel, set the extender in the locked state and locking the SIM.

20. The computer program product of claim 17, wherein the extender further comprises one or more Subscriber Identity Module (SIM) interfaces, each SIM interface is configured to receive a SIM for use with the cellular modem, and the instructions are executable on the one or more processors of the extender further for:
 in response to verifying the information received from the host router over the secure encrypted channel, setting the extender in the locked state and locking the SIM;
 in response to receiving, from the host router, one or more messages indicating a request for unlocking:
  setting the extender from the locked state to an unlocked state in which the extender is logically unlocked; and
  unlocking the SIM.

* * * * *